(12) United States Patent
Grossman

(10) Patent No.: US 9,513,698 B2
(45) Date of Patent: *Dec. 6, 2016

(54) SYSTEM AND METHOD FOR SETTING FUNCTIONS ACCORDING TO LOCATION

(71) Applicant: Victor A. Grossman, Staten Island, NY (US)

(72) Inventor: Victor A. Grossman, Staten Island, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/629,443

(22) Filed: Feb. 23, 2015

(65) Prior Publication Data

US 2015/0169044 A1    Jun. 18, 2015

Related U.S. Application Data

(63) Continuation of application No. 14/010,503, filed on Aug. 26, 2013, now Pat. No. 8,963,698, which is a continuation of application No. 13/301,079, filed on Nov. 21, 2011, now Pat. No. 8,519,836, which is a continuation of application No. 12/819,951, filed on Jun. 21, 2010, now Pat. No. 8,093,998, which is a continuation of application No. 12/001,145, filed on Dec. 10, 2007, now Pat. No. 7,755,472.

(51) Int. Cl.
| | |
|---|---|
| B60R 25/10 | (2013.01) |
| G06F 3/01 | (2006.01) |
| B60R 25/04 | (2013.01) |
| B60R 25/33 | (2013.01) |
| G08B 13/14 | (2006.01) |
| G08B 21/02 | (2006.01) |
| G08B 29/22 | (2006.01) |
| B60R 25/00 | (2013.01) |

(52) U.S. Cl.
CPC .............. *G06F 3/01* (2013.01); *B60R 25/00* (2013.01); *B60R 25/04* (2013.01); *B60R 25/33* (2013.01); *G08B 13/1427* (2013.01); *G08B 21/0261* (2013.01); *G08B 29/22* (2013.01)

(58) Field of Classification Search
CPC ............................. B60K 15/03; B61L 15/009
USPC ..... 340/995.17, 995.24, 426.11, 438, 539.13
See application file for complete search history.

(56) References Cited

U.S. PATENT DOCUMENTS

| | | | |
|---|---|---|---|
| 6,741,188 B1 * | 5/2004 | Miller | G06Q 30/0255 340/539.13 |
| 7,409,221 B2 * | 8/2008 | Obradovich | G01C 21/26 340/988 |

(Continued)

*Primary Examiner* — Phung Nguyen

(57) ABSTRACT

An apparatus, system, and method for controlling functions of a vehicular alarm. The method includes receiving one or more signals including location information, determining a location of the vehicle using the location information, setting one or more functions based on the location information, determining whether an alarm function is activated, and activating the one or more functions according to the setting upon determining that an alarm has been activated. The method may further include using GPS data or signals transmitted from one or more base stations (e.g., from cellular telephone base stations, computer networks, proprietary transmitters, etc.) to determine the position of the apparatus (e.g., installed in the vehicle). The apparatus may also inform a user of regulations relating to an area dependent upon its location.

20 Claims, 16 Drawing Sheets

(56) References Cited

U.S. PATENT DOCUMENTS

2006/0185756 A1* 8/2006 Sato .................... B60S 5/02
  141/94
2006/0284767 A1* 12/2006 Taylor .................. G01C 21/00
  342/357.64

* cited by examiner

SYSTEM AND METHOD FOR SETTING FUNCTIONS ACCORDING TO LOCATION

CROSS REFERENCE TO RELATED APPLICATION

This application is a continuation of U.S. patent application Ser. No. 14/010,503, filed Aug. 26, 2013, now U.S. Pat. No. 8,963,698 which is a continuation of U.S. patent application Ser. No. 13/301,079, filed Nov. 21, 2011, now U.S. Pat. No. 8,519,836, which is a continuation of U.S. patent application Ser. No. 12/819,951, filed Jun. 21, 2010, now U.S. Pat. No. 8,093,998 which is a continuation of U.S. patent application Ser. No. 12/001,145, filed Dec. 10, 2007, now U.S. Pat. No. 7,755,472, the contents of each of which are incorporated herein by reference.

FIELD OF THE INVENTION

The present invention relates generally to system for setting functions in vehicles, and more particularly to an apparatus and method for activating various functions based on location.

BACKGROUND OF THE INVENTION

As conventional vehicular alarm systems become more commonplace, their accompanying annoyances have correspondingly increased. Thus, although conventional active vehicular alarm systems are designed to draw attention, they may do so repeatedly and for the wrong reason. When activated, conventional alarms use lights, or audible alarms (such as sirens, horns, speakers, etc.) and/or wirelessly page an owner. Unfortunately, conventional vehicular alarm systems are not always perfect, and frequently experience false alarms which can contribute to noise pollution impacting the quality of life of many people, especially those in urban areas. Each year it is estimated that millions of dollars in cities alone are lost because of noise pollution. Accordingly, as car alarms are a contributing factor to noise pollution (especially when an alarm cycles on through the night) municipalities have enacted ordinances to control and/or ban certain types of car alarms (e.g., those with audible alarms). It has been said that the noise pollution emitted by car alarms is responsible for hundreds of millions of dollars of lost income each year.

Conventional vehicle alarm systems are known to commonly experience false alarms for many reasons. For example, some alarms can be triggered by air gusts, vibration, loud noises, partially open doors, windows, hoods, and/or trunks, low voltage, sensor malfunctions, etc., which can be a nuisance. For example, a defective switch periodically triggering an alarm of a vehicle parked in an urban setting, such as a residential New York City street, would be a nuisance to those within range of the alarm's siren. Accordingly, there is a need for an alarm system that would prevent the creation of a nuisance. There is also a need for an alarm system that can prevent the theft of a vehicle.

Accordingly, there is a need for a vehicular alarm systems whose functions can be controlled to avoid the problems and disadvantages of the prior art.

SUMMARY OF THE INVENTION

Therefore, it is an object of the present invention to solve the above-noted and other problems of conventional vehicular alarm systems and to provide a mobile device (e.g., an alarm system) and a method for protecting vehicles and setting and/or resetting various alarm functions automatically based on location data. It is another aspect of the present invention to provide an alarm system with means to comply with local ordinances without the user's intervention.

It is another object of the present invention to provide a system and a method for enabling a user to set and/or reset various alarm settings based on the user's desire.

It is yet another object of the present invention to provide a system and a method setting an alarm system's functions using location data and an optional look-up table to set various functions of a vehicular alarm system to location-specific settings.

The present invention provides a system and a method for ideally setting various functions of a vehicular alarm system. Accordingly, it is an object of the present invention to provide a mobile station including a plurality of controllable functions, including a receiver which receives one or more signals which include location information; and a controller which receives location information from the receiver; determines the location of the mobile station using the location information; sets one or more functions of the mobile station based on the location information; and activates the one or more functions based upon the setting. The controller may also enter an alarm mode and thereafter determine whether a triggering event has occurred (e.g., a trigger signal is generated). The controller may activate the one or more functions when the controller determines that a trigger signal has been generated and displays information relating to regulations corresponding to the location. The controller may also set the one or more functions based upon the regulations. The one or more functions may, for example, correspond to an audible device function, an ignition/run function, a window function, a light function, a lock function, a paging function, a privacy function, an energy refilling function, and a valet function. The mobile station may function as a vehicle security system and disable or restrict operation of the vehicle when the controller is in an alarm mode or, for example, after a triggering event has occurred.

Moreover, the one or more settings can be set using the location data and a predetermined setting. Further, the predetermined setting can be programmed at the time of manufacture, programmed by a user, and/or received from a base station or a satellite. The alarm can be activated using a sensor or a wireless transmission. Moreover, the alarm system can determine whether the alarm was activated wirelessly, and can then activate the functions according to the determination. It is further contemplated that if the alarm is activated wirelessly, a first set of functions is activated, and if the alarm is set using a sensor, a different set of functions is activated. In yet other aspects of the present invention, if the alarm is activated using a wireless transmission, an audible alarm sounds according to a predetermined routine. Additionally, the alarm system can determine whether a trigger signal has been received, and trigger the alarm system if it is detected that a trigger signal has been received.

It is yet another aspect of the present invention to provide a control system for a vehicle, including a receiver which receives one or more signals which include location information; and a controller which receives location information from the receiver; determines the location of the vehicle using the location information; sets one or more functions of the vehicle based on the location information; determines whether to set an alarm of the vehicle; determines whether one or more trigger signals is detected; and activates the one or more functions based upon the setting, when it is determined that a trigger event signal has been generated. The trigger event signal may be generated by at least one of a window sensor, a door sensor, a sound sensor, a movement sensor, and a wireless signal. Further, according to the present invention, the controller may display information relating to regulations corresponding to the location and/or set the one or more functions based upon the regulations. The functions, may for example, relate to a horn function, a speaker function, an ignition/run function, a window function, a light function, a lock function, a paging function, a door function, an energy refilling function, a privacy function, and a valet function. The controller may output information corresponding to a present location upon determining that the location of the vehicle has changed or that, for example, certain regulations have changed from a previous location. Further, the controller may restrict operation of the vehicle when a trigger event signal is detected.

It is also contemplated that the system according to the present invention can receive one or more signals including the location information from a Global Positioning System (GPS) and/or one or more base stations. The system can also include means for determining whether the location information is received from one or more terrestrial transmitters, and for determining location using a triangulation routine. The system can also include means for receiving alarm setting information, including information relating to the one or more functions of the system. The system may also include means for activating and means for setting the one or more functions, including at least one of a siren setting, a light setting, an activation setting, a paging setting, a reset setting, an "on/off" setting, and a sensor setting.

According to the present invention, it is also contemplated that the settings can be set in accordance with location data and/or one or more predetermined settings. These predetermined settings can include settings that are programmed at the time of manufacture, programmed by a user, and/or received from a base station or a satellite. The system can be activated using a sensor or a wireless transmission such as those emitted from a key fob.

It is also contemplated that the system can determine whether an alarm function was activated wirelessly and can activate functions according to the determination. For example, if the alarm function is activated wirelessly, a first set of functions is activated, and if the alarm is set using a sensor, a different set of functions is activated. By this method, if the alarm is triggered using a wireless transmission, an audible alarm sound can sound, whereas if the alarm system automatically activates, then an audible sound would not be produced.

It is a further aspect of the present invention to determine whether one or more trigger signals has been received while in the active alarm state, and to activate the functions of the alarm system according to a predetermined routine if it is determined that a trigger signal has been received.

It is yet a further aspect of the present invention to provide a method for controlling functions of a vehicular alarm system, the method including receiving one or more signals including location information, determining a location of the vehicle using the location information, and setting one or more functions of the alarm system based on the location information, such that the one or more functions can be activated according to the setting.

It is an additional aspect of the present invention to provide a method for controlling a vehicle, including receiving, using a receiver, one or more signals which include location information; and receiving, using a controller, location information from the receiver, determining, using the controller, the location of the vehicle using the location information; setting, using the controller, one or more functions of the vehicle based on the location information; and activating, using the controller, the one or more functions based upon the setting. The method may further include activating, by the controller, an alarm and thereafter determining whether a trigger event has occurred, wherein the trigger event generated by one or more of an infrared or ultrasonic sensor, a door sensor, a window sensor, an ignition sensor, a pressure sensor, and a movement sensor. The method may further include activating, using the controller, the one or more functions when it is determined that a trigger event has occurred. The method may also include outputting via a speaker or a display an energy refilling option when it is detected that the vehicle has entered an energy refilling area or displaying information relating to regulations corresponding to the location of the vehicle. Further, the method may also include setting, using the controller, the one or more functions based upon the regulations, wherein wherein the one or more functions relate to a horn function, a speaker function, an ignition/run function, a window function, a light function, a lock function, a paging function, a door function, an energy refilling function, a privacy function, and a valet function.

The alarm system according to the present invention can also obtain location data and determine the location of the alarm system using the location data, and can then set the one or more functions based on the location data

BRIEF DESCRIPTION OF THE DRAWINGS

The invention is herein described, by way of example only, with reference to the accompanying drawings, wherein.

DETAILED DESCRIPTION OF THE INVENTION

Preferred embodiments of the present invention will now be described in detail with reference to the drawings. For the sake of clarity, certain features of the invention will not be discussed when they would be apparent to those with skill in the art.

Figure 1:
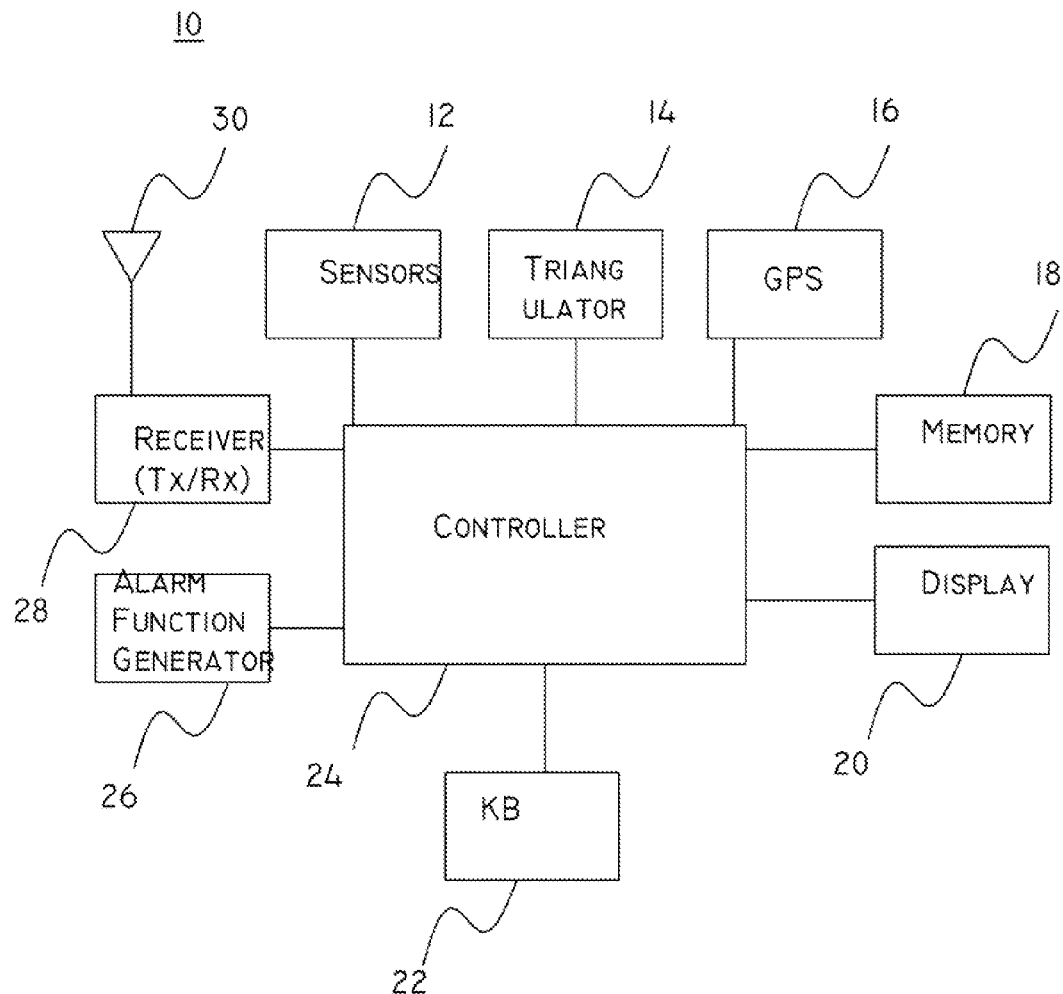
FIG. 1 is a block diagram illustrating a vehicular alarm according to the present invention.

A block diagram illustrating a vehicular alarm according to the present invention is shown in FIG. 1. The alarm system includes at least one mobile station 10 (hereinafter alarm system 10) which includes a controller 24, an optional display 20, a memory 18, a GPS (global positioning system) module 16, sensors 12, an alarm function generator 26, a transceiver (or optional receiver) 28, and an antenna 30. The alarm system 10 can include any or all of the various components or can interface with external components to obtain necessary data. For example, the alarm system can interface with another computer (e.g., an on-board GPS system) via a PC (Personal Computer) interface, an RS 232 serial interface, a USB (Universal Serial Bus) interface, a GPIO (General Purpose Input Output) interface, a Bluetooth interface, etc., as necessary to transmit and/or receive necessary data. Further, the system according to the present invention may store, receive, process, upload, and/or download data using a network. Accordingly, the present invention may be compatible with, network systems such as, for example, the conventional On-Star™ information systems. Accordingly, for example, one or more components of the system according to the present invention may be located remotely from others.

The controller 24 controls the overall operation of the alarm system 10 and can interface with the optional display 20, the memory 18, the GPS module 16, the sensors 12, the alarm function generator 26, the transceiver 28, and the antenna 30. The sensors 12 can interface with the controller 24 and provide and/or receive information to/or from the controller.

The sensors 12 can include one or more of motion sensors (e.g., vibration sensors, wheel speed sensors, magnetic sensors, accelerometers, etc.), door sensors, window sensors, ultrasonic and/or acoustic detectors (e.g., microphones and/or audio transceivers), voltage sensors, ignition-switch deactivation sensors, etc., as is known in the art. The sensors 12 can output a desired signal to the controller 24. Additionally, sensors 12 can include a sensor for generating and/or receiving signals indicative of an ignition on condition (e.g., ignition-on indicator), an alarm off/deactivation input (that can be used to turn the alarm system off and/or deactivate it, etc.), a window-open indicator (to indicate an open window), a door-open indicator (indicative of an open door), a time signal input (for generating a signal indicating a predetermined time period has expired), a polling/interrupt signal (that can be used to interrupt the controller, etc.), and/or other signals as necessary to control the alarm system 10 according to the present invention. For the sake of clarity, as alarm sensors are well known in the art, they will not be discussed in further detail. Further, the controller may communicate with one or more of the sensors 12, the triangulator 14, the GPS module 16, the memory 18, the display 20, the KB 22, the alarm function generator 26, and the transceiver 28 using optical, wired and/or wireless means.

The antenna 30 can include one or more antennas for transmitting and/or receiving signals to/or from the alarm system 10. For example, the antenna (or antennas) can receive cellular communications signals, from one or more transmitters (e.g., base stations (BSs), application points (APs), nodes (e.g., node Bs), etc.) such as those that are used for conventional cellular communications, e.g., GPS signals, magnetic field strength signals (e.g., magnetic field directions signals, etc.), and other desired signals (e.g., desired frequencies, etc.). Additionally, the antenna 30 can include diversity-type antennas.

The transceiver 28 receives signals from the antenna 30 and can downconvert (and/or otherwise process received signals such as by amplifying, etc.) the received signals, as required, and transmit the signals, which may be processed, to the controller 24. For example, if a modulated signal is received such as a radio frequency (RF) signal, then the transceiver 28 can downconvert (and/or amplify) the modulated signal to a desired frequency such as an intermediate frequency (IF) signal or other signal as desired. In a similar fashion, the transceiver 28 can upconvert signals (e.g., IF) it receives from the controller 24 and transmit the upconverted (e.g., RF) signals via the antenna 30. Accordingly, the alarm system 10, according to the present invention, may receive data, voice, magnetic field signals, etc., as desired.

The optional triangulator 14 receives one or more signals received by the antenna 30 (e.g., signals received from a plurality of BSs and/or GPS signals) via the transceiver 28 and controller 24 and uses triangulation methods to triangulate the position of the alarm system 10. Such triangulation methods are known in the art and, for the sake of clarity, will not be discussed further.

The GPS module 16 receives GPS signals from the antenna 30 via the transceiver 28 and the controller 24, and optionally determines the location of the alarm system 10 using the received signals. The GPS module may also use AGPS (Assisted GPS) or other location assistance data to determine its location.

The accelerometer included within the sensors 12 can include one or more accelerometers (oriented in one or more axes) for providing acceleration data corresponding to one or more axis to various components of the alarm system 10 as necessary. For example, acceleration data may be used by the GPS module 16 and/or the triangulator 14 to determine the position of the alarm system 10. The acceleration data can also be used to determine whether the vehicle is moving and to trigger an alarm (as will be discussed later) based on the determination. Additionally, the accelerometer may be used to provide data for other vehicular components via an external output (not shown). For example, accelerometer data can be used by on-board control systems (e.g., stability control systems, anti-lock braking systems (ABS), steering control systems, etc.,) as necessary.

The memory 18 interfaces with the controller 24 and can provide a memory for the operations of the control system. For example, the memory can store control data, look-up tables, user settings, operating commands, application programs, audio data, map data, location data, sensor data, etc. The memory 18 can include a hard disc, a read-only memory (ROM), a random access memory (RAM), a flash memory, an external memory (e.g., a memory card), etc., as desired. The memory cards can be preprogrammed according to location. For example, memory cards can be obtained from a local motor vehicle office and can contain operating commands. An optional reader (e.g., a laser reader—not shown) can be used to read various data from a printed bar code or other printed code to set the various functions of the alarm system. A motor vehicle registration sticker may include data indicative of the capabilities and the settings of the vehicle alarm system. This information can then be scanned and used by the vehicle alarm system according to the present invention.

The keyboard (KB) input 22 can include one or more functions keys, alphanumeric keys, a touch-screen input, a wireless input, a track ball, mouse, and/or other input device, for entering commands to control the alarm system 10.

The optional display 20 interfaces with the controller 24 and can include a liquid crystal display (LCD), an organic LED (OLED), an electroluminescent (EL) display, etc., as desired. The display can be used to display operating status, settings, user inputs (e.g., via the KB), etc. of the alarm system 10.

The optional alarm function generator 26 can receive inputs from the controller and can generate signals necessary to drive various elements of the alarm system 10. For example, the alarm function generator 26 can provide a signal to drive an alarm (e.g., a siren, speaker, etc.), various lights (e.g., the vehicle's lights, either internal or external), ignition cut-off switches, ignition-on switches, location systems (e.g., LoJack™, LoJack™-type systems or the like), pager systems, etc., for indicating and/or drawing attention to the vehicle as necessary. The alarm function generator 26 may also provide a signal to be transmitted to desired receivers (e.g., the police, emergency personnel, etc.) via any of the controller 24, the transceiver 28, the antenna 30, and/or other means. The controller 24 may also transmit a desired signal using the antenna 30 via the transceiver 28, or can use other types of communicators. For example, a Bluetooth™-type communication device (not shown) may interface with the alarm system 10 (e.g., at the controller 24), and may used to transmit data as desired.

For example, using the Bluetooth communication device, a user may upload/download various data (e.g., alarm system settings, functions, status, alarm events, etc.) from the alarm system 10, as desired, using a mobile communication device (e.g., a mobile phone, a PALM™-type device, a computer, etc.). Additionally, third parties (e.g., emergency personnel, police officers, etc.) may obtain data about a vehicle as desired. This data may be disseminated on a need-to-know basis or in an otherwise limited manner. In this way, law enforcement personal may obtain data about a vehicle as they approach it. For example, during a traffic stop, as a police officer approaches a stolen vehicle, he may be warned by the alarm system 10 via a police-issued radio that the vehicle may be stolen so that he may respond appropriately. This can be critical when dealing with dangerous situations and/or persons. Accordingly, when a vehicle is determined to be stolen (e.g., by the alarm system 10, or via a signal received via the transceiver), the controller may respond appropriately. In alternative embodiments, the alarm system 10 may use other transmitting schemes (e.g., CDMA, etc.) to transmit and/or receive signals.

Figure 2:
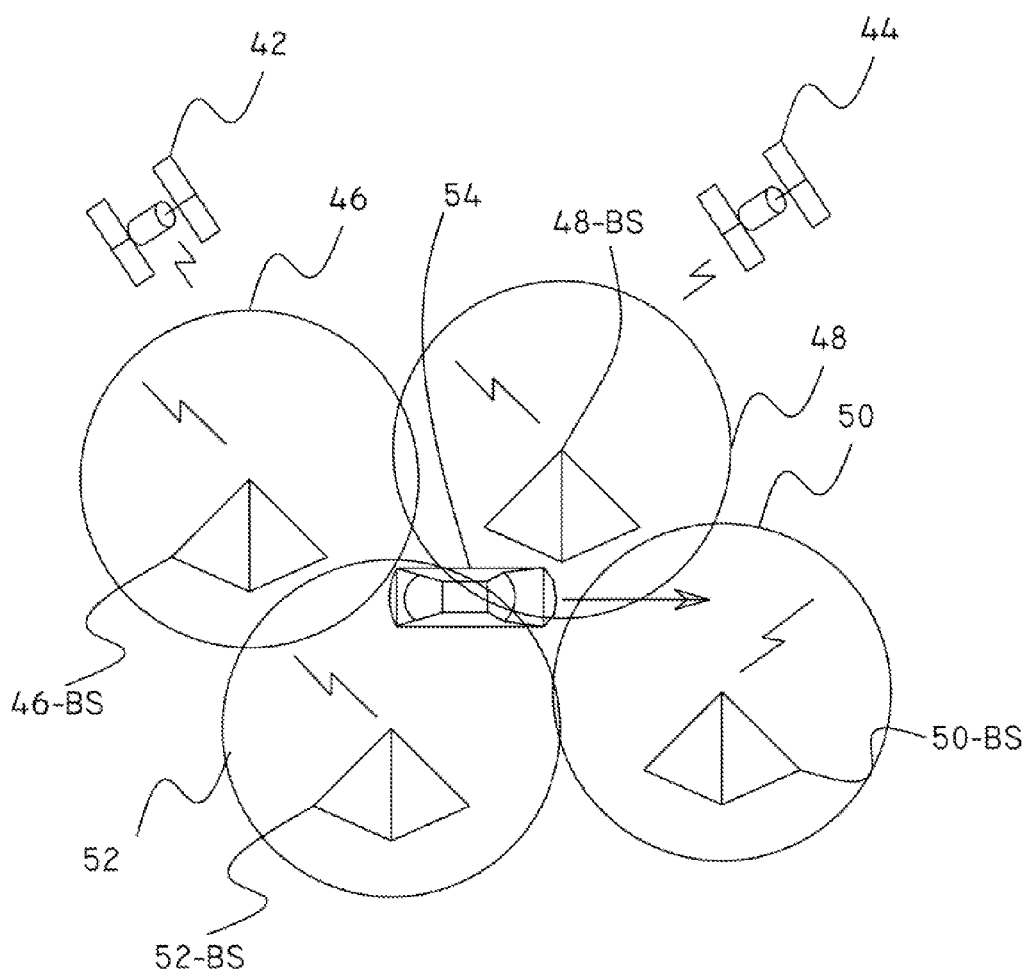
FIG. 2 is a block diagram illustrating a vehicle transmitting/receiving data from various transmitters according to the present invention.

A block diagram illustrating a vehicle transmitting/receiving data from various transmitters according to the present invention is shown in FIG. 2. A vehicle 54 including an alarm system according to the present invention receives signals from BSs which cover corresponding areas 46-54 (e.g., BSs 46-BS, 48-BS, 50-BS, and 52-BS, respectively). Additionally, other transmitters and/or GPS satellites (or other types of satellites) 42 and 44 can be used to cover corresponding areas and can be used to transmit (and/or receive) data to/or from the alarm system. As such, the alarm system can obtain necessary signals and use triangulation techniques, AASA, GPS, etc., to calculate and/or otherwise obtain its location. Optionally, the location of the alarm system 10 can be determined at a location that is remote from the alarm system 10 (e.g., by a transmission system), in which case the calculated location can then be transmitted to the alarm system 10. Optionally, the alarm system 10 can receive a signal transmitted from a transmitter 56 that indicates that the vehicle is in a specific alarm zone (i.e., a specific area).

Figure 3:
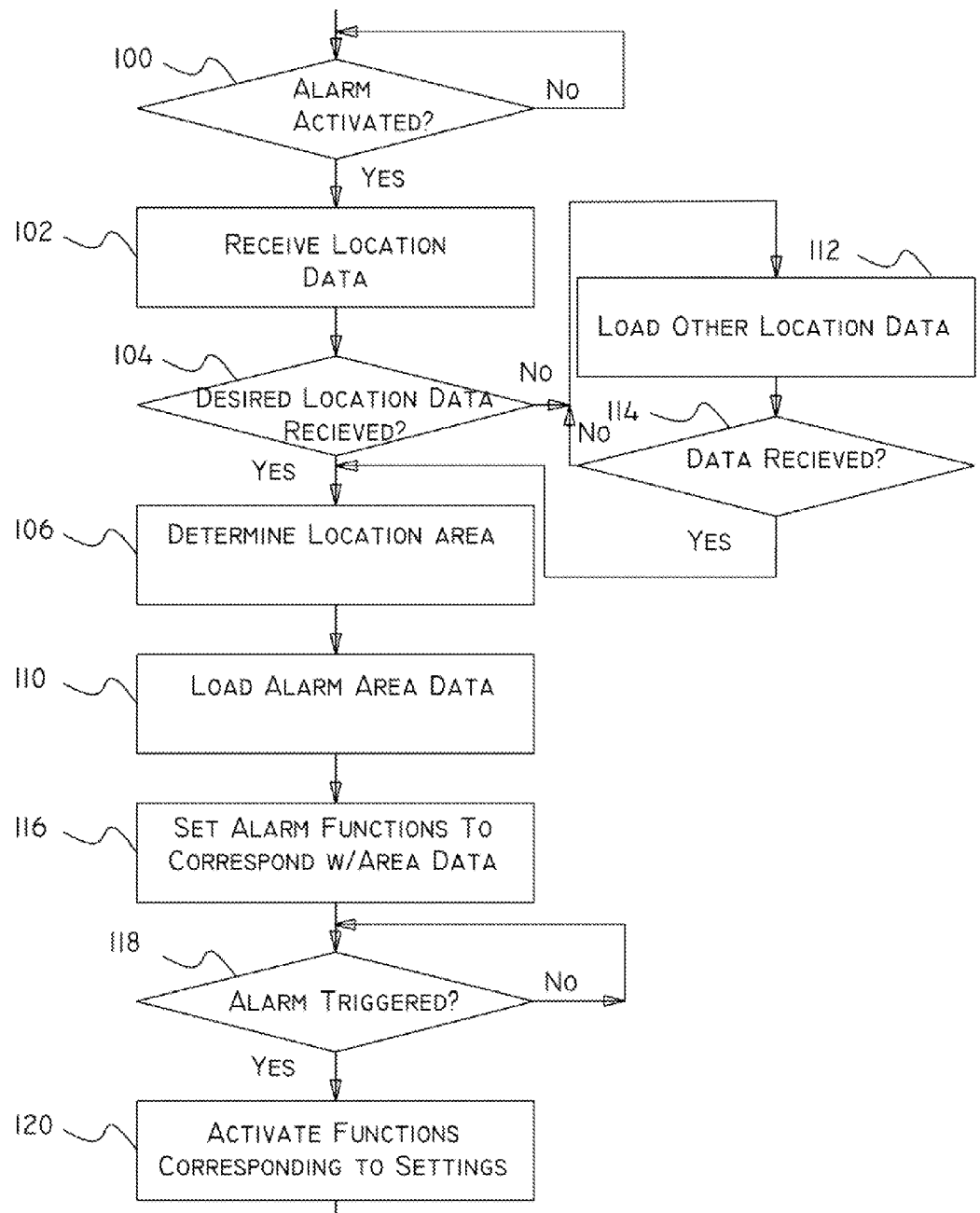
FIG. 3 is a flow chart illustrating the operations of the alarm system according to the present invention.

A flow chart illustrating the operations of the alarm system according to the present invention is shown in FIG. 3. Flowchart 300 may include one or more of steps 100-120. In step 100, an alarm system according to the present invention determines whether an alarm is activated. The activation process can be initiated according to a predetermined routine. For example, when an ignition-off signal is received by the controller 24 from, for example, the sensor module 12, and a signal indicating that the driver's door (or any other door) has been opened and is presently shut (since the alarm system has been toggled from the on to the off position), the alarm system can be activated. Additionally, when an appropriate signal is received (e.g., the ignition-off signal), the alarm system 10 can activate after a given time period (e.g., 20 seconds—which can be determined by location, etc., or immediately) as desired. Additionally, the alarm system may activate when, for example, an optional passenger detector detects that there are no passengers in the vehicle and the ignition is optionally off, etc. Additionally, the alarm system 10 can activate when a remote command is received or after a given time period, etc, and may use a signal indicative of a operational key (e.g., an actual key being in the ignition switch or an RFID (Radio Frequency IDentification) key) being in a location that is proximate to the alarm system sensor. In other words, the alarm system can be activated according to various sensory inputs and received signals either alone or in combination with each other and according to location, time or other indicator (e.g., actual time, date, countdown period, vehicle in park, parking brake activated, driver's door opened and shut, an alarm activation signal received from a remote key fob, etc., or combinations thereof, etc.). For example, in certain areas it may be desirable to activate an alarm after 10 seconds; accordingly, location data corresponding to the area can command the alarm system 10 to activate after 10 seconds. Additionally, when activating, the alarm system 10 can activate functions as desired and can optionally activate various functions according to location information (location data). For example, the alarm system can activate an audible generator (e.g., a horn, etc.), and/or lights, for example, when arming, to indicate its status, according to location. Thus, when arming in an area in which it is prohibited to honk a horn, the alarm system would not honk the horn to indicate activation status.

In step 102, location data is received. The alarm system may receive location data as desired. Thus, the alarm system 10 may receive triangulation data, one or more pilot signal (s), a message, and/or GPS data, as available and/or according to a predetermined method (e.g., triangulation data first, then GPS data, etc., or vice versa, etc). The alarm system may also receive a signal indicative of a certain area (as will be described below). The alarm system may also receive current location data. For example, the GPS module may calculate the position of the vehicle on a continual basis (e.g., for display on, for example, the display for use during operation of the vehicle). When the alarm system is activated, the location data including the location data may be used by the alarm system to determine location.

In step 104, it is optionally determined whether the desired location data is received. For example, if the desired location data is a GPS data, then if GPS data is received, the location of the alarm system 10 is determined using the received data in step 106. However, if the desired location data is not received in step 104, an attempt to receive other location data (e.g., triangulation data, etc.) can be attempted, in step 112. The controller may use various sensor(s) (e.g., an accelerometer, etc.), as necessary to determine its location and generate location data. Additionally, stored location data (e.g., previous location data, default location data, etc.) may be used instead of real-time location data. For example, as described above, location data may be obtained from a GPS navigation system in the vehicle when the alarm system is activated. Accordingly, the alarm system may obtain location information from the navigation system at any time, as necessary. Furthermore, the controller may use the transceiver in an attempt to receive (real-time) location data. Triangulation data may also be received, from transmitters serving a particular area, to generate location data. For example, the alarm system may receive signals from certain transmitters and then transmit information corresponding to the received signals to the transmitters which use the received information to calculate the location of the alarm system and generate and transmit location data to the alarm system. The transmitters may be cellular phone transmitters such as base transmitter system (BTS) transmitters. Additionally, the location data may include AASA GPS data received from, for example, the cellular BTSs. In step 114, the alarm system determines whether desired location data was received. If desired location data was received, the alarm system continues to step 106. However, if desired location data was not received, the alarm system repeats step 112, and can either attempt to obtain a different type of location data or can attempt to receive the same type of location data (e.g., triangulation data rather than GPS data).

Returning back to step 104, if the desired location data is received (and if, for example, the location of the alarm system has not yet been determined), the location of the alarm system 10 is optionally determined in step 106. However, if the alarm system receives its location via another system (e.g., receives its location via a network or receives a signal indicative of a certain area without having to determine its location), the alarm system may not have to perform this step.

In step 110, the alarm system 10 loads area data. The area data may be included in the location data or may be stored separately. For example, the location data may include a message indicating an area, a cell, a location, etc. The message indicating the area may also contain alarm function data (as will be described below with respect to Table 1). However, the alarm system may also be programmed (e.g., at the time of manufacture and/or at other times, e.g., yearly, etc.) with alarm function data which is optionally associated with alarm area data. Thus, using the area data, the alarm system can use the look-up table to determine corresponding alarm function settings. This can reduce network loading.

In step 116, alarm functions are set according to the area data. For example if the area data corresponds with an urban location (e.g., New York City), then the functions of the alarm system are set according to the location.

In step 118, it is determined whether the alarm was triggered. If the determination in step 118 is positive, step 120 the process continues to step 120. However, if the determination is negative step 118 may be repeated.

In step 120 the alarm system activates functions according to corresponding settings. The process may then repeat step 118, 110, may exit the process (e.g., if deactivated for example, by a user).

According to the present invention, depending upon the set functions of the alarm system, different sensors may be used to activate and/or trigger the alarm system while other sensors or at least some of their data can be ignored. Thus, for example, assuming that in a certain area regulations restrict triggering an alarm using a motion sensor and also restrict the output of an audible alarm (such as the horn) when triggered, the alarm system would not be triggered by the motion sensor input and, if triggered, would not output an audible alarm. Thus, during activation or when triggered, the alarm system (unless overridden) activates and/or triggers in accordance with the area data, and drives functions such as alarms, lights, windows, wireless transmitters, etc., in accordance with the area (and/or a user's or systems setting). For example, with reference to Table 1, if the alarm functions are set to the Hospital area, then the alarm would be triggered for 60 seconds and the horn would not be activated. Additionally, different functions of the alarm system can also be activated for varying periods of time as desired. For example, the horn can be activated for 10 seconds, the lights can be activated for 90 seconds, and the police can be alerted (e.g., wirelessly) for an extended period of time (for example, two days, at, for example, predetermined time periods, etc.), so that the vehicle may be located. Additionally, the functions can include history data for storing various data relating to the alarm system. Thus, using history data, the controller can optionally determine, for example, whether the alarm system has been triggered a certain number of times within a predetermined period of time and control the alarm system appropriately by, for example, deactivating and/or ignoring certain sensors and/or their output. Thus, a malfunctioning sensor can be deactivated and/or ignored to prevent false alarms.

The alarm system can deactivated and/or a triggered state can be set/reset using various inputs, as desired. For example, an input transmitted from a remote controller such as, for example, a key fob, when received, can, for example, control or otherwise deactivate the alarm system from an activated state. Moreover, other inputs such as an ignition-on indicator, a door-lock-activated indicator, etc., can be used to deactivate and/or end a triggered state, as desired. For example, if a user cycles a door-lock cylinder 3 times in 5 seconds, the alarm system may be deactivated. This can be convenient, for example, if a battery of a user's key fob lacks sufficient power to transmit a desired signal such as an alarm deactivation signal. The controller can also determine when to deactivate the alarm using various sensory inputs, as desired, and which are not discussed here for the sake of clarity.

It should be noted that although a given order is shown in the flowchart of FIG. 3, this order may not have to be followed and various steps may be skipped and/or performed in a different order. For example, the location data may be received with or without the area data, in which case the location and corresponding alarm data can be determined in a single step. For example, the location data may contain location information such as longitude and latitude which can be used to determine if the alarm system is located in a predetermined area. The alarm system can then set its functions according to the predetermined area. For example, the alarm system may compare its present location with predetermined information (e.g., information indicating the alarm system is located in a hospital area, etc.) and set its functions accordingly.

Furthermore, if using a cell identification, the exact location of the alarm system does not have to be determined. For example, if it is determined that the alarm system is located in an area served by a certain base station (BS), a signal determined as having arriving from this BS may be sufficient to determine the location of the alarm system. Moreover, certain BSs may transmit location data that can be used to determine an approximate location of the vehicle and may also be used to obtain location data for setting functions, etc., of the alarm system. For example, a BS may broadcast its location, information indicating an area, e.g., area 01 and/or alarm system function settings, using for example, flags.

A look-up table can also be used to determine alarm-function settings. For example, if the proper conditions exist for the alarm system to activate (e.g., a predetermined interval passes after a given condition exists, etc.), the alarm system may determine that it is located in a default area "0," and set functions corresponding to area 0, as shown in Table 1 below. In other words, when the alarm is activated (optionally according to area information, etc.), a horn function (or other audible source) may be functional when necessary (i.e., a horn will honk when the alarm system is triggered), vehicle lights may be functional when necessary (e.g., lights will flash when necessary), an ignition immobilizer may be activated, windows may be shut upon alarm activation, a valet setting is set to off, door locks are locked, a wireless pager is activated, and a vehicle status (e.g., location, speed, etc.) may be sent to desired locations (e.g., the police, the owner, etc.) if the vehicle is stolen to aid in the location of the vehicle. Likewise, if the alarm system detects that it is in home area "1," then the alarm is not activated (e.g., when the vehicle is parked), the vehicle's windows may be closed and all other functions are not activated—i.e., the door locks are not activated, etc, so that a user can conveniently enter the vehicle in the secure home area. Further, the system according to the present invention may set functions and/or obtain location information at any time, as desired.

The alarm system may also detect its distance to buildings and other objects, such that when the vehicle is within a certain distance of a predetermined building, certain functions may not be activated. For example, if the alarm system detects that it is within 200 feet of an office building, then the horn would not be functional when the alarm system is activated (or triggered). Likewise, similar settings can be used in a school and/or hospital setting, as desired. The distance to the building (or other object) can be calculated using GPS (e.g., using longitude and latitude data), triangulation, pre-determined map data (e.g., indicating the location of objects such as buildings, schools in the vicinity of the alarm system, etc.), and/or other signals. Accordingly, the alarm system can calculate its position and compare its position with map data to determine the distance between an object and the alarm system.

Moreover, signal generators may also be used to transmit a predetermined signal (e.g., a pilot signal, broadcast signal, etc.) such that when the alarm system receives this predetermined signal, it can determine that it is within a certain predefined area (e.g., a hospital, school, a quiet zone, etc.).

For example, a hospital can use a signal generator to generate an alarm-restricting signal. The alarm system upon receiving this restricting signal, would set its functions to correspond to the restriction signal (e.g., to a quiet mode in which a siren and/or horn is not activated when the alarm is activated and/or triggered). The area covered by the restricting signal can be controlled to cover a predetermined area as desired.

Additionally, the alarm system may have one or more user settings that allow a user to customize various settings, as desired. The user may also set a work and/or home (or other) setting(s) according to location, etc., as desired. The alarm system functions may also be set according to time, location, proximity, etc., as desired. Thus, during the day, certain functions may be activated as desired (e.g., see, area "5" setting). Likewise, if the alarm system detects that it is in a garage, it may set various settings accordingly, as desired.

Although the garage setting can be activated by using a table look-up to determine location, the garage setting may also be determined using by using a transmitter, located in, for example, the garage, that transmits a signal that indicates that the alarm system is in the garage (or in parking area, etc.). In this regard, a local transmitter may be located in the garage and may be used to transmit a signal (e.g., an FM signal which can include a message and/or other information) to the alarm system to indicate that the vehicle is in (or is proximate to) the garage. Such sensors may be stand-alone units or may be coupled to, for example, a garage door opener or other transmitters. Thus, when a user drives the vehicle including the alarm system of the present invention into the garage, the local FM signal (or other modulated signal, an optical signal, etc.) may be transmitted to the alarm system. Upon receiving the FM signal (which may include a message including area data, a code, etc.), the alarm system may change its settings to correspond with the received signal. Accordingly, a garage door opener in a user's garage may be coupled to a local transmitter (e.g., an FM modulator, an optical transmitter such as an infra-red transmitter as used on remote controls, a Bluetooth transmitter, etc.) for alerting the alarm system that the vehicle is in the garage (or other location). Accordingly, the alarm system may perform necessary control operations (e.g., operate various menus, set functions, etc.).

Additionally, the alarm system may indicate possible settings for a user to select before the alarm system can activate or upon activation of the alarm system. For example, when entering a commercial parking garage, a valet setting (and/or other settings) may be displayed on a display screen (e.g., a touch-screen display) and the user can select a desired setting. If the valet (or other setting) is selected then, for security purposes, a security code (or other input) may be necessary to enter another setting. For example, after entering the valet mode, a security code may have to be input (through for example, the KB or the user's cellular telephone) to deactivate the valet setting (which can, for example, lock the hood and/or trunk to prevent theft, and optionally place the engine in a low-power mode to prevent damage to the vehicle, shut the ignition if the vehicle travels a certain distance, etc., to prevent theft and/or unauthorized use of the vehicle).

A look-up table indicating alarm function settings is shown in Table 1 below.

TABLE 1

| AREA/Alert time (sec) | Type | Function | | | | | | | | |
|---|---|---|---|---|---|---|---|---|---|---|
| | | Activate | Horn | Lights | Ig. Im. | Window | Valet | Lock | Wireless | Police |
| 0/90 | Default | Yes | Yes | Yes | Yes | Yes | No | Yes | Yes | Yes |
| 1/90 | Home | No | Act. Only | — | — | Close | No | — | — | — |
| 2/90 | City-01 | Yes | No | Yes | Yes | Yes | No | Yes | Yes | Yes |
| 3/90 | Mall | Yes | >200' | Yes | Yes | Yes | Yes | Yes | Yes | Yes |
| 4/90 | Mall | Yes | <100' | Day | Yes | Yes | No | Yes | Yes | Yes |
| 5/90 | City-02 | Yes | Day | Yes | Yes | No | No | Yes | Yes | Yes |
| 6/90 | Work | Yes | No | Yes | Yes | No | No | Yes | Yes | Yes |
| 7/90 | City-03 | Yes | Yes | Yes | Yes | Open -if Child | No | Yes | Yes | Yes |
| 8/90 | Beach | Yes | No | No | Yes | No | No | Yes | Yes | Yes |
| 9/60 | School | Yes | No | No | Yes | Yes | No | Yes | Yes | Yes |
| 10/90 | Industrial | Yes | Yes | Yes | Yes | Yes | No | Yes | Yes | Yes |
| 11/90 | Garage | No | — | — | — | Open | Yes | Open | — | — |
| 12/90 | User 01 default | Yes | Yes | Yes | Yes | — | Yes | Yes | Yes | Yes |
| | User 01 School | Yes | Yes | Yes | Yes | Yes | Yes | Yes | Yes | Yes |
| | User 0.1 Work | Yes | Yes | Yes | Yes | Yes | Yes | Yes | Yes | Yes |
| 13/90 | User 02 | Yes | No | Yes | No | No | No | No | No | No |
| 14/60 | Hospital | Yes | No | <60 s | Yes | Yes | No | Yes | Yes | Yes |
| 15/90 | Valet | Yes | No | No | No | No | Yes | No | No | No |
| 16/90 | TEMP | Yes | Yes | Yes | Yes | Yes | No | No | Yes | Yes |

The "Type" settings may be activated according to a user and/or location, as desired. Accordingly, the User 01 setting may have corresponding location settings. For example, a first user may have a custom school setting or a custom work setting as shown. Thus, when in the User 01 School area, the alarm system will set its functions according to the corresponding entries as shown.

Table 2 is a table illustrating an alternative look-up table.

TABLE 2

| Area | Alert time (seconds) | Function | Restricted |
|---|---|---|---|
| 1 | 90 | Lights and Wireless | Audible Alarm |
| 2 | 90 | Lights | Audible Alarm and Wireless |
| 3 | 60 | Lights | Audible Alarm for >60 sec. |
| 4 | 90 | Lights, and Audible Alarm <90 sec and audio out <90 sec and 70 db. | Audible Alarm if >1 Activation per Hour |
| 5 | Non-applicable | Lights and engine Warm | Engine Run >2 Minutes temperature dependent. |

As shown in Table 2, alarm functions can also be set for various time periods depending upon operation. For example, if the alarm system is located in area 1 for example, a densely populated New York City street), the audible alarm function is restricted. However, the lights and wireless paging system would remain active to indicate that an alarm is triggered.

Likewise, if in area 3, the lights and wireless paging functions would be active. However, the audible alarm system would only remain active for a time period which is, for example, less than or equal to 60 seconds, after which the audible alarm would be deactivated. Similarly, if in area 5, the lights and engine warm (i.e., a function to optionally start and run an engine to warm it up) would be available for less than or equal to 2 minutes, after which the engine run would restricted. In other words, the engine would be shut off after two minutes of operation. The alarm system may also include means to start the vehicle, upon receiving a proper command signal (e.g., from the user via a network, key fob, etc.). Moreover, other optional conditions may be used. For example, if the temperature is lower than 20 degrees, then the engine run time can be extended by either a predetermined time or by a predetermined factor. For example, for every unit decrease in outdoor temperature, a multiplier for multiplying a predetermined time may be used to obtain a new run time such that the engine run time can be extended in colder weather. Thus, if the multiplier is proportional to the drop in temperature, a 10-degree drop would yield a multiplier of 10. Accordingly, the base time (e.g., 2 minutes) can be multiplied by the multiplier to obtain a 20-minute run time. This would be beneficial in colder environments where it may be desirable to warm an engine (and the vehicle) before driving. However, in the summer when it is may not be necessary to fully warm an engine before driving for longer periods of time. However, a shortened run time may be desirable to reduce exhaust emission and/or noise pollution and comply with any motor vehicle regulations regarding engine-idle periods. Accordingly, the present invention may be used to enforce compliance with various regulations. Additionally, the present invention may reduce fuel use and emissions. Thus, not only may vehicles be brought into compliance with various regulations, but cities in which the vehicles according to the present invention are located, may also comply with various regulations.

With reference to area 4, it is seen that the alarm system may also regulate the strength of the audible alarm such that it does not exceed a predetermined threshold (e.g., 70 db) as shown. The alarm system can include a signal limiter or may include feed back means to regulate the output of the audible alarm (e.g., the horn). Additionally, the controller may play various selections (e.g., songs, music scores, etc.) as desired by the user, at various events (e.g., such as alarm triggering). These selections may be directly downloaded via a hard-wired connection or via a networked connection, as desired. For example, the selection may be obtained via a Bluetooth-equipped device in the vehicle (e.g., an MPEG-3 player, etc.). An optional sensor (e.g., using direct means of feedback) may be used by the controller of the alarm system to control a speaker output such that an audible sound generated to alert the user of a triggering event, etc. does not exceed the predetermined threshold.

As shown, the look-up tables may correlate predetermined areas with corresponding alarm system functions. As such, look-up tables may incorporate data, as necessary or desired. For example, as described above, the tables can include longitude and latitude data defining an area, and may also include other alarm system function data to be added by the user. Additionally, the tables may include time-dependent settings such that certain features can only be operated (or are prohibited or otherwise restricted) at certain time periods.

Figure 4B:
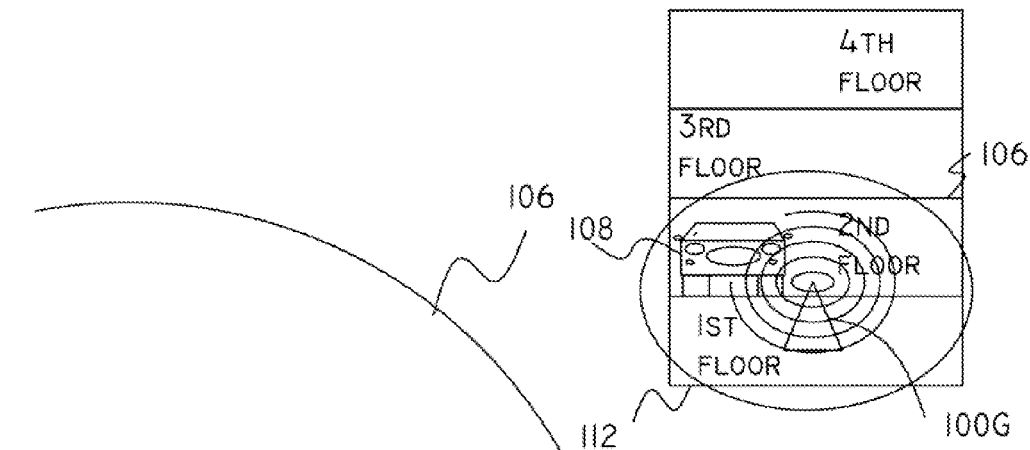
FIGS. 4A and 4B each illustrate a block diagram illustrating the operation of the present invention using one or more broadcast signals.
Figure 4A:
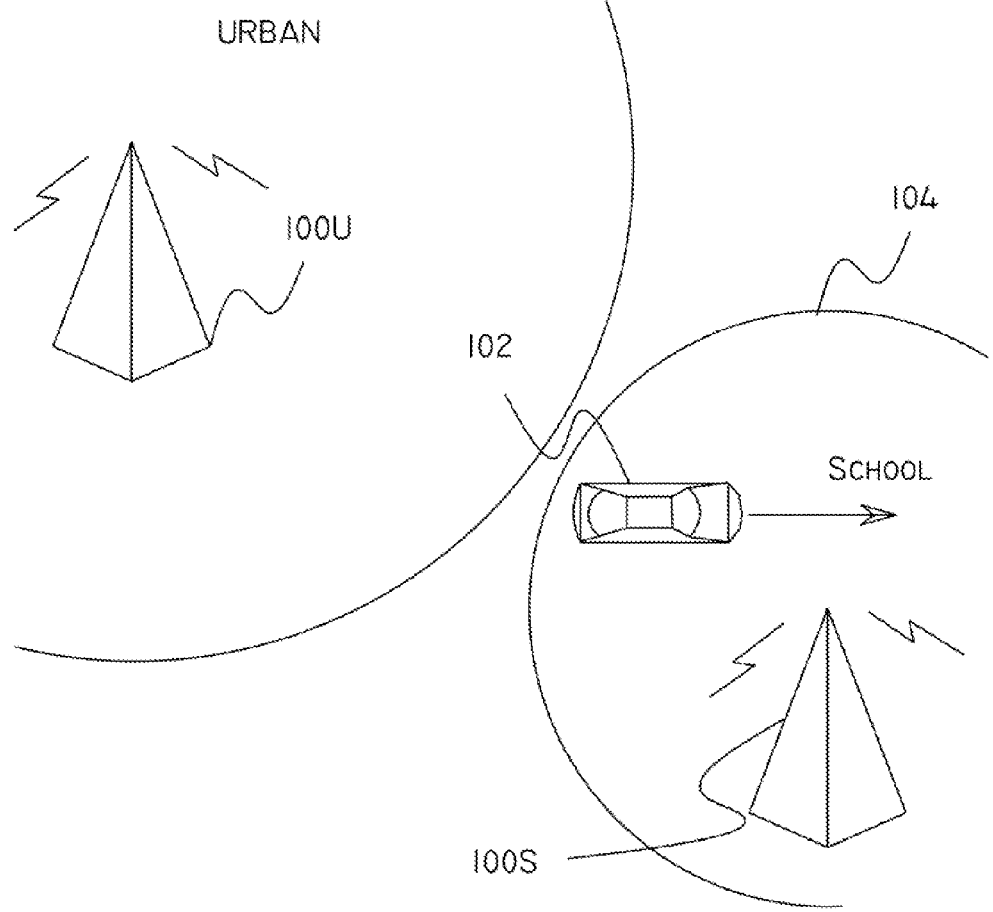

A block diagram illustrating the operation of the present invention using one or more broadcast signals is shown in FIGS. 4A and 4B.

With reference to FIG. 4A, broadcast signals (e.g., a pilot signal, a signal from one or more predetermined channels, etc.) may be broadcast from transmitters 100U and 100S and may be received by an alarm system according to the present invention located in a vehicle 102. The alarm system upon detecting the broadcast signal indicating that the alarm system is within a predetermined area 104 indicative of, for example, a school zone (as shown), and optionally determining that an alarm function mode should be activated according to predetermined conditions, sets the alarm function mode according to a predetermined setting corresponding to the predetermined area or areas. The broadcast signal may also contain function data, which can be received by the alarm system and used by the alarm system to set its various functions accordingly. For example, the broadcast signal may contain one or more flags corresponding to one or more functions. The one or more functions would then be set based on the corresponding received flags. Thus, a signal with the flag setting of 01 corresponding to audio-alarm and lights functions, respectively, would disable the audible alarm and maintain the functionality of the lights. Thus, when activated, only the lights function would operate and the audible alarm would remain silent. Likewise, an 11 flag setting would enable the audible alarm and maintain the functionality of the lights. The flag settings may also include a single bit or any number of bits as desired and/or required. Additionally, the flags may be sent continuously or may be discontinuous in both time and frequency. The broadcast signal can correspond with a predetermined area classification. If the flags are commonly assigned throughout a given region, alarm-system settings may be effortlessly set in these regions and quality of life may be enhanced for those in the various regions.

The alarm system may also use a predetermined weighing factor to decide a priority for alarm function data. For example, if the alarm system is located in both a school zone and a hospital zone, the alarm system can use the weighing factor to determine which zone should be used to set the functions. For example, if the hospital zone has a greater function-setting weight, then it would be the preferred setting in the presently described dual setting environment. However, the alarm setting factors may also be weighted to determine an appropriate setting(s).

The alarm system may also obtain alarm-function data using broadcast, multicast, and/or singlecast data. Additionally, paging channels may be used. Accordingly, the alarm system could listen to a paging channel, and upon determining that it is being paged, receive a predetermined channel to obtain data such as location data, alarm function data, optional map data, etc., as desired.

With reference to FIG. 4B, an alarm system is shown located in vehicle 108 that is situated in a multi-level parking garage 110. A broadcast or other transmitter 100G broadcasts a signal throughout region 112. However, only vehicles in close proximity would receive the broadcast signal. Thus, a valet mode can be targeted to vehicles within a certain distance from a desired location.

Various screen shots illustrating a graphics display screen for informing a user, etc., of alarm function settings, etc., are shown in FIGS. 5A-5F.

Figure 5A:
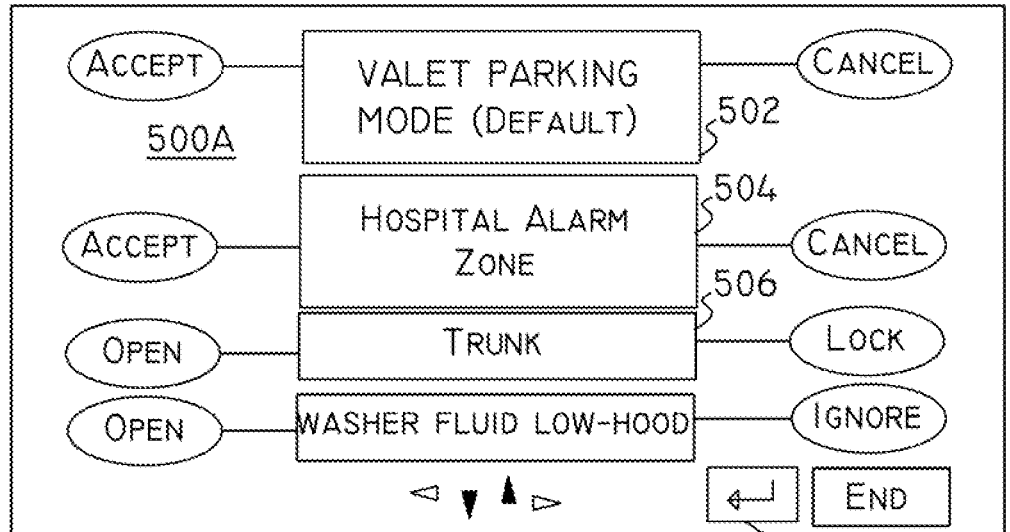
FIGS. 5A-5H each illustrate a screen shot of a graphics display screen for informing of alarm function settings.

With reference to FIG. 5A, upon detecting that it is in a certain area, such as a parking area, various options relating to the area may be displayed on the display. For example, a valet parking mode menu item 502 is displayed so that a user can accept or cancel a valet parking function using, for example, a touch-screen display. The user may optionally select the valet parking mode menu item 502 to adjust other settings. For example, selecting the valet parking mode menu item 502 may display submenu items relating to the valet parking mode menu item 502 as shown in FIG. 5E (and as will be described below). The various screens may also include navigation buttons, enter buttons, etc. as desired. For the sake of clarity, not all available buttons, menu items, enter buttons, etc., are shown in the figures.

Moreover, if the vehicle is in a predetermined zone, which may have multiple alarm-function areas, then the various areas can be displayed by order or priority, etc. For example, as shown in FIG. 5A, the vehicle is assumed to be situated in both valet and hospital zones. As the valet parking mode is assumed, for example, to have a higher weight than the hospital zone, it is displayed in a given order (by weight), above the hospital zone menu 504.

However, the menu items may also be displayed using other methods. For example, using heuristic analysis, it can be determined that the user is more likely to use the hospital setting as opposed to the valet mode setting (at certain times, days, etc.). Accordingly, this mode (i.e., the hospital mode) can be set as a default mode during these times and the user given the option to override the hospital setting and select the valet mode (or other mode) if desired.

The heuristic analysis can use various inputs such as time, place, driver identification (e.g., user 01, user 02, . . . , etc.), vehicle capacities, fluid levels, temperature, weather, location, etc., to determine an applicable alarm function mode. For example, using heuristic analysis, the alarm system may determine that the user 02 is more likely to use a valet setting in the current time/location. Accordingly, the alarm system may display the valet menu above any other menu items in an ordered list. The alarm system may also display the menus and/or set given modes depending upon the order in which they were detected. Thus, if a user enters a hospital zone and thereafter enters a valet zone, the hospital zone may be displayed first, depending upon settings. Heuristic analysis is known in the art and will not be discussed for the sake of clarity.

Other relevant options are also shown on the display screen 502 depending upon various settings. For example, it may be desirable to display a trunk menu item 506 when displaying a valet mode menu item or when it is determined that the car is being parked, so that a user may conveniently unlock the trunk to remove items before the vehicle is parked by, for example, a valet (at which time the trunk may be locked).

Figure 5B:
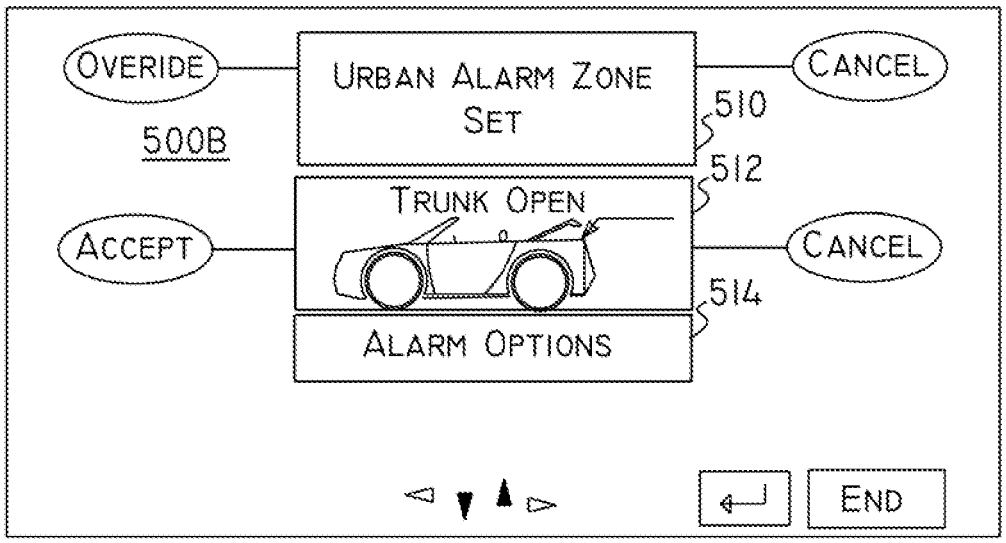

With reference to FIG. 5B, when it is determined that a vehicle is likely to be parked, a menu 500B relating to various parking options may be displayed. As shown, the menu displays an urban alarm zone menu item 510 indicating that the alarm setting is set to an urban alarm zone, and the user is optionally provided an option to cancel, override and/or otherwise respond to these settings. Moreover, a trunk open menu item 512 may be displayed and an optional alarm-setting menu item 514 may also be displayed.

Figure 5C:
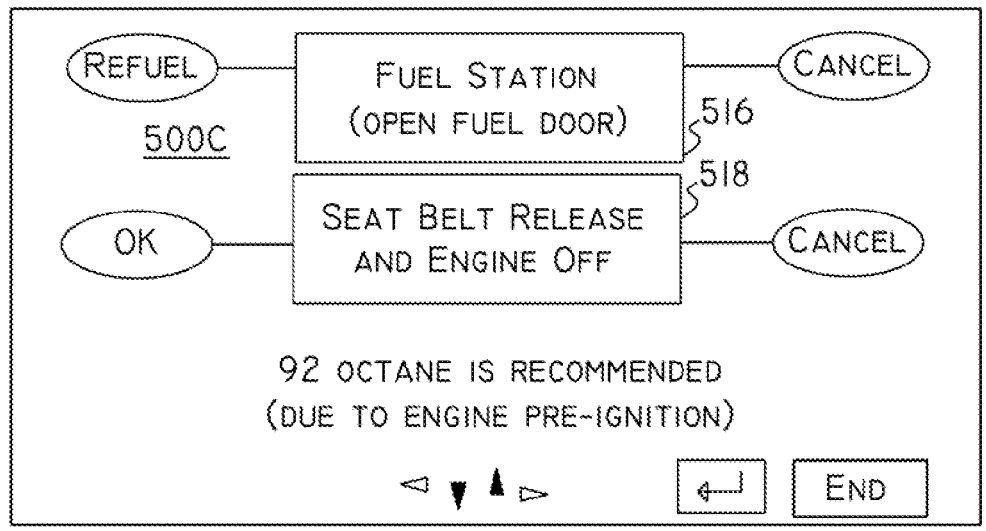

With reference to FIG. 5C, a menu 500C (an energy refilling menu) may be displayed when it is determined that the vehicle is in a fuel station (or an energy refilling area such as, for example, a fuel station, a battery exchange area and/or station, near a battery charger or charging station, etc.) and the vehicle is optionally determined to be in "Park" (i.e., when the vehicle's transmission is in a "Park" setting that is indicated by a park signal produced by any of various means such as a vehicle's controller, transmission controller, transmission selector switch, etc., that may be received by the alarm system). The menu 500C can include a fuel station (or energy refilling station) menu item 516 which may be used to activate predetermined functions. For example, a vehicle's fuel door (or cap, neither of which is shown) may be unlocked by selecting the fuel station menu item 516. Optionally, selecting the fuel station menu item can also shut off the vehicle and unlock the vehicle's doors and/or passenger seatbelts, for both the safety and convenience of the user and/or passengers in the vehicle. The fuel station menu may also include an option to set the vehicle's ventilation system to a recirculate mode (to avoid the intake of fuel vapors from the fuel station). The recirculate mode may be activated when it is detected that the vehicle is within a certain distance of a fuel station, regardless of other settings. However, the recirculate mode may be set with regard to other settings, if desired. Accordingly, a recirculate menu item (not shown) may be displayed so that the user can determine appropriate settings. Moreover, an optional seatbelt-release and/or engine-off menu item 518 can be displayed for user selection. These and other menu items may be optionally combined depending upon settings. Other sensor data may also be used to determine appropriate menus to activate and display on the screen. For example, if the fuel gauge indicates that the tank (or battery energy level) is more than ½ full (or some other preset level), the refuel menu would not be displayed when it is determined that the alarm system has entered a fuel station. Additionally, a time period may be used such that if a menu item is not selected by a user within a given time period, the menu 500C is no longer displayed and a previous or other screen may be displayed. A fuel-door switch may also be coupled with the alarm system according to the present invention such that selecting the fuel-door switch causes the seatbelts to open and/or the ignition to turn off (as is required in many areas) provided that the vehicle is in park, etc., as desired. Thus, compliance with local ordinances and regulations may be ensured in an effortless manner. Moreover, when the vehicle is started after refueling, a menu item indicating an odometer reset option and a fasten-seat-belt option may also be displayed. The system may also respond to different types of fuels or fueling stations. For example, in an electric refueling station (e.g., for refueling an electric vehicle), a battery charge door, vents, fans, etc. may be activated, as desired. Likewise, in a hydrogen refueling station (e.g. for a hydrogen fuelled vehicle), a fuel door may be opened, windows may be opened, fans may be activated, etc., as desired.

Further, the system according to the present invention may determine whether it may be desirable to use a different fuel such as a fuel with a higher, same, or lower octane rating. Thus, the performance of the vehicle may be monitored and a "refilling suggestion" displayed with the refueling menu. Accordingly, the user can be informed to use higher octane fuel for better performance if, for example, engine knock above a certain predetermined threshold is detected when using the current fuel. Further, the receiver may transmit/receive information (e.g., wirelessly to/from, for example, the refilling station) relating to the current fuel (that the vehicle is refilling with) or may present an option to the user to select a grade of fuel so that the controller may use this information for later use. Thus, the controller, for example, upon determining that the engine did not knock beyond the predetermined threshold using the current fuel (i.e., the fuel which the vehicle used prior to the current refilling), may inform the user that the current grade of fuel (e.g., 89 octane is sufficient). Likewise, upon detecting excessive knock (i.e., knock beyond the predetermined threshold) the controller may inform the user to use a fuel with a higher octane rating (e.g., 93 octane). Further, the system according to the present invention may calculate a cost/benefit and/or performance/benefit of each grade of fuel so that the user may determine a proper grade of fuel. For example, the user may be informed (e.g., via a display and/or a speaker) that the engine performance may increase 10% if a higher grade of fuel (e.g., above 92 octane) is selected. The system according to the present application may also user location information, trip information (e.g., departure-destination information), vehicle performance data (e.g., load, temperature, speed, etc.) and other data (e.g., outside temperature, altitude, etc.) to determine a desirable fuel rating to use which can then be output to the user (e.g., via a display and/or a speaker). Accordingly, desired information may be output to the user when, for example, the energy refilling menu is displayed or at other desired times (e.g., when selected by a user, etc.). Further, each of the fuel type/grade, performance, and/or cost variables may weighed (e.g., by the user, a vehicles manufacturer, etc.) so that the controller may determine a desired fuel. Further, the controller may save past data and use heuristic analysis (which is well known in the art) to determine a desired fuel.

Figure 5D:
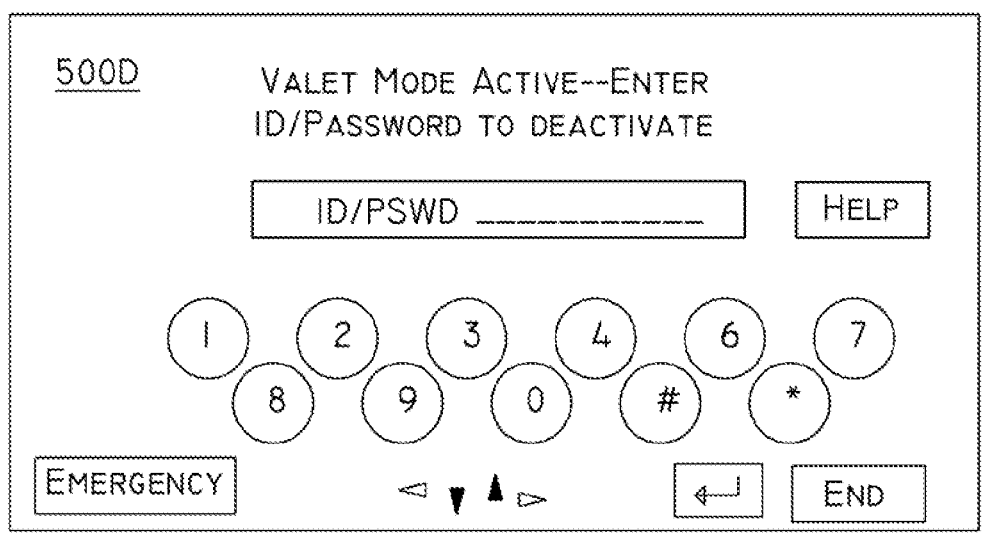
Figure 5E:
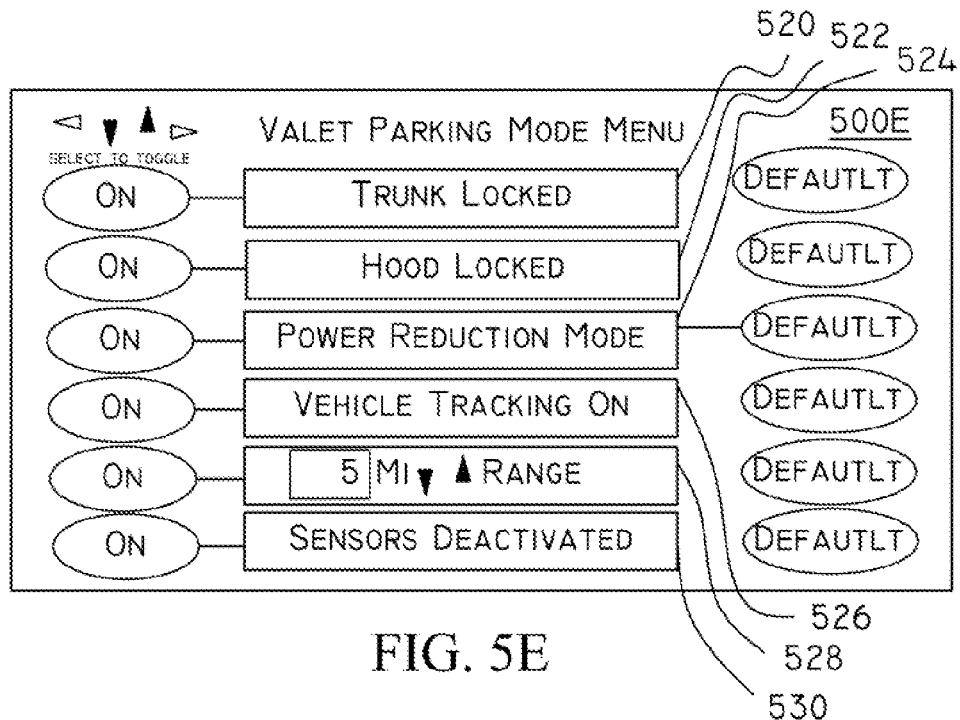

With reference to FIG. 5D, a menu 500D, which may be displayed when the valet mode is selected, is shown. The valet mode active menu 500D displays a message indicating that the valet mode is active and may provide the user with an option to cancel the valet mode. Accordingly, the user may enter a predetermined code using, for example, a touch-screen input. In other embodiments, the valet mode may remain active within a predefined area (e.g., the valet area in which the valet mode was activated, a limited distance, an area within a certain signal area, etc.) and the insertion of a key into a lock cylinder may not be necessary to start (or run) the car. For example, when the user arrives, a key carried by the user and within a certain distance of the vehicle (e.g., such as a conventional ignition key, a radio frequency (RF) key, can be detected by the alarm system and the valet mode automatically cancelled. As described above, the user may also use a mobile station (e.g., a cellular telephone) to cancel a valet mode. Moreover, the user may also use an e-mail service or a short message service (e.g., an SMS message) to send a message to the alarm system to deactivate (or cancel a desired mode of) the alarm system. The alarm system may also use other broadcast means to send/receive messages from mobile stations. For example, a user's key fob can be used to deactivate the valet mode. Likewise, Bluetooth™ communication means can also be used to transmit data to and from the alarm system.

With reference to FIG. 5E, a submenu 500E corresponding to the valet parking mode menu item 502 (shown in FIG. 5A) is shown. When a user selects the valet parking mode menu item 502, submenu 500E is displayed to allow the user to view, select and/or change various settings, as desired. For example, the user can view various functions that are associated with, and/or set, the valet mode. These settings can include submenu items for setting a trunk-locked setting 520, a hood-locked setting 522, a power-reduction-mode setting (for reducing engine output which can be desirable in high-powered vehicles) 524, a vehicle-track setting (for providing a location tracking function for the vehicle and/or recording the vehicle's operating functions during the valet mode) 526, a range setting (which may be adjustable) 528 for setting an operating range (e.g., total distance traveled or absolute range), in which, for example, the vehicle's ignition can be turned on, and outside of which various optional functions may be activated (or rather inactivated) (e.g., the vehicle's ignition (or run mode) can be turned off, the transmission locked in park, a GPS tracking system activated, and police notified, etc.) to prevent unauthorized use the vehicle, and an alarm sensor deactivation setting for selecting which sensors will be deactivated in the valet mode (e.g., see, menu items 520-530 and their corresponding buttons). Although not illustrated, a privacy option may be optionally included. This privacy option may be selected, either via an initial setting or by a user, to hide non-essential data from being selected and/or displayed. Accordingly, data which is to be private (e.g., phone lists, address data (e.g., location/navigation data, etc.) may be prevented from being displayed, thus ensuring a user's privacy. Further, the user data may be displayed according to a user. Thus, a first user may information displayed, functions set, etc., according to a first setting and a second user may have information displayed, functions set, etc., according to a second setting.

Figure 5F:
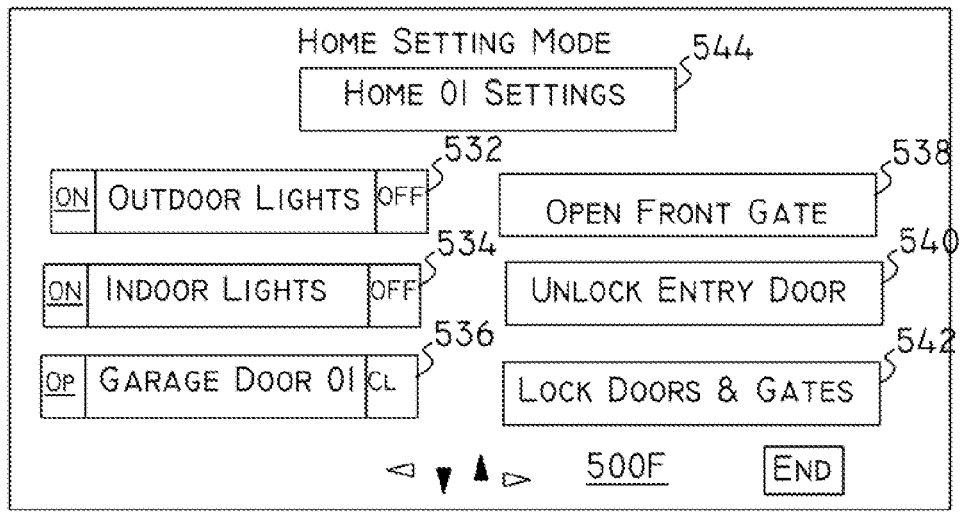

With reference to FIG. 5F, a menu 500F is shown. The menu 500F may be displayed when it is detected that the user is located in the home 01 alarm zone. Accordingly, when in the home 01 alarm zone, various predetermined menu items 532-542 may be displayed for the user's selection. For example, the user can activate outdoor lights, indoor lights, or garage door 01 opener, open front gates, unlock an entry door (i.e., a house's front door, etc.), and/or lock all doors and/or gates by selecting corresponding menu items 532, 534, 536, 538, 540 and 542. Additionally, an optional menu item 544 may be displayed to indicate an alarm zone setting (e.g., a home 01 zone) for the user's selection (for example to select, override, adjust settings, etc., as desired). Although it is preferred that most menu items (e.g., menus 5A-5E) are displayed when in a given alarm zone and/or when the vehicle is in the parked transmission selection position (e.g., for automatic transmission vehicles) or the parking brake is engaged (for manual transmission vehicles), it may be preferable to display menu 500F when it is determined that the vehicle will be located in a home zone shortly. This can allow the user to enter without having to stop the vehicle, which may be necessary for example, to open front gates to a property while the vehicle is on a main road, when stopping may be undesirable. Accordingly, heuristic analysis can use data such as time (including date), user, location, distance to expected location, etc. to determine either or both expected location and time to expected location.

At least some of the menus shown in FIGS. 5A-5F, may be displayed as desired. For example, menu 5A can be displayed when the alarm system detects a change of zones (e.g., when the alarm system determines that it has recently entered an alarm zone) and certain conditions are met, e.g., the car has been recently (e.g., within 20 seconds) placed in a parked transmission-selection position. Likewise, other menus may also be displayed as desired depending upon system configuration.

The alarm system can also use other sensor data (e.g., GPS data, Assisted GPS (AGPS), magnetic field data, acceleration, distance data, etc.) to determine that the vehicle will be entering the home alarm zone shortly (as opposed to leaving the home alarm zone). As such, the alarm system may use location data to determine its location on a periodic basis and/or use interrupts to indicate that the vehicle is in a predetermined area.

For example, the GPS function module may be used to continually calculate the position of the vehicle when it is determined that the vehicle is in a predetermined area or about to enter a predetermined area, and an interrupt can then be generated to signal this condition and predetermined routines may be performed (e.g., various menus corresponding to an area may be displayed, various functions set, etc.).

With reference to FIG. 5F, when receiving a specific signal such as, for example, an optical signal or RF signal corresponding to a home location, the alarm system may perform functions related to the area, e.g., display menu 500F may be displayed. Moreover, various data and or system inputs may be combined. For example, if as described above, an alarm system detects certain inputs within certain time periods (either alone or in combination) and receives one or more specific signals, the alarm system may perform certain procedures.

Figure 5G:
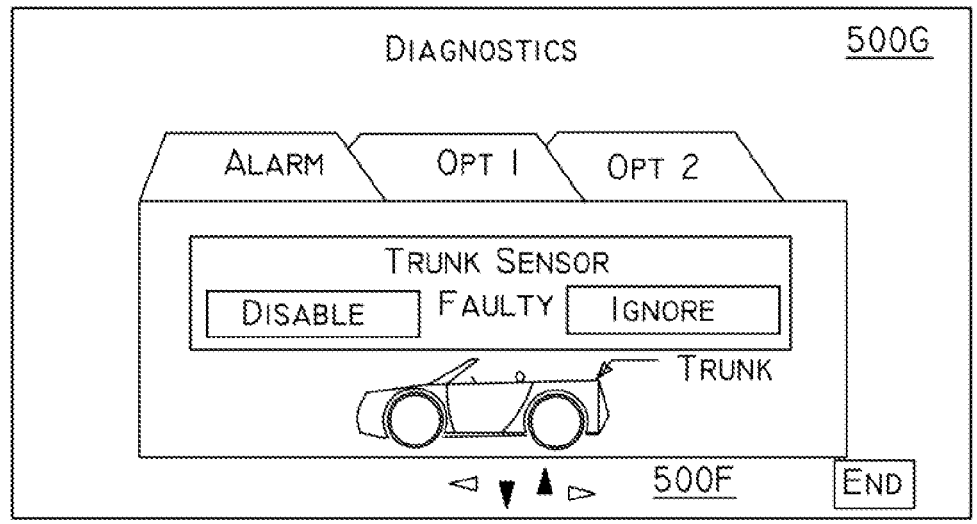
Figure 5H:
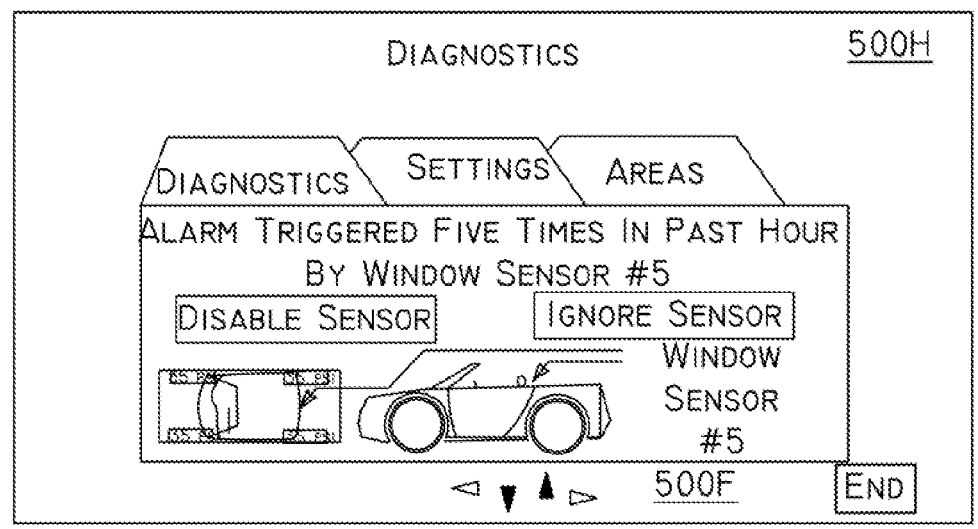

With reference to FIG. 5H, an option menu 500H for providing a user with the option to select and/or set various settings is shown. For example, a menu (as indicated by, for example, a "diagnostic" menu tab entitled diagnostics) may display certain system settings on the display and allow the user one or more options to customize the alarm system. Thus, as shown the user may select to ignore the menu screen or disable a window sensor, as shown.

Figure 6:
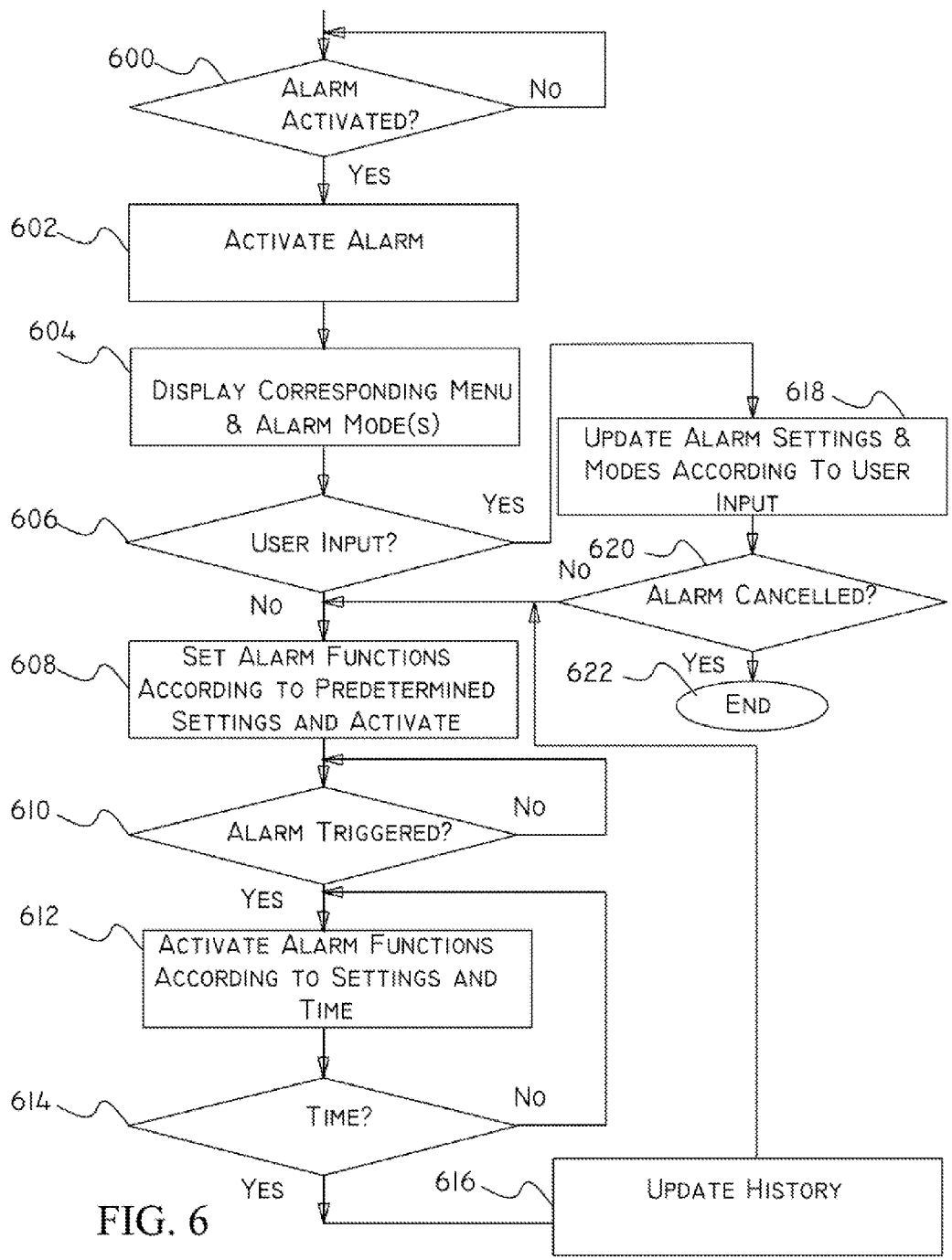
FIG. 6 is a flow chart illustrating the operations of the alarm system according to the present invention is shown in FIG. 6.

A flow chart illustrating the operations of the alarm system according to the present invention is shown in FIG. 6. In step 600, it is determined whether the alarm system should be activated. The alarm system may be activated using various settings such as, for example, manufacturer-programmed settings, user-programmed settings, area-based settings, etc. For example, the alarm system can determine whether to activate by determining whether conditions such as the ignition is off, the driver's door has been opened and shut, and a countdown timer has reached a maximum count, before activating the alarm. A signal received from a remote transmitter (or an RF tag) may also be used to activate the alarm system. Additionally, other methods for activating the alarm system may also be used as desired.

Based on the determination of step 600, the alarm system is activated in step 602.

In step 604 it is determined whether to display a menu for user selection. If a menu is not desired (e.g., the vehicle does not have a display available, a display function is not set, etc.), step 606 may be performed rather than the display step of step 604. However, if a menu display is desired in step 604, a corresponding menu which can correspond to a default setting, to received location data, or to the location of the vehicle, etc., is displayed. The displayed menu can also be displayed for a predetermined amount of time. The display may include an LED display, or some other indicator in lieu of a graphic display.

In step 606, it is determined whether an input from a user is received. If it is determined that a user input is received (optionally within a predetermined time period), step 618 is performed. However, if it is determined that a user input is not received (e.g., within a predetermined time period), step 608 is performed.

In step 618, the user input is used to update the alarm system settings according to the user input. Moreover, the history data of the alarm system may be updated to reflect the user input.

In step 620 it is determined whether cancel command (such as an exit command) has been received. In other words, it is determined whether to exit (i.e., not to activate) the alarm activation routine, and if it is determined to do so, the routine is ended in step 622.

Returning to step 608, the alarm system functions are set according to the alarm mode and optionally to history data.

In step 610, it is determined whether the alarm system is triggered. If the alarm system is triggered, step 612 is performed. However, if the alarm system is not triggered, then step 610 may be repeated.

In step 612, the alarm system activates functions corresponding to the set functions and continues to step 614.

In step 614, the alarm system determines whether a predetermined time interval (which may have been started when the alarm system was triggered in step 610) has elapsed. If it is determined that the predetermined interval has elapsed, the alarm system optionally updates the alarm history data in step 616 and then may repeat step 608. Alarm history data can include the number of times the alarm system has been activated within a certain period of time, the corresponding time of activation, sensor inputs e.g., if the alarm system has been triggered by a certain door sensor, etc., each time out of the past 10 activations. Then using this alarm history data, the alarm system can determine a desired action (e.g., deactivate the certain sensor) and/or alert the user of the current state of the alarm (e.g., 10 activations, 9 of which were triggered by the left door sensor), and the user can take a desired action such as, for example, instruct the alarm system to ignore the left door sensor, open the left door and close it (e.g., in minivans or other vehicles with an automatic door or hatch opener/closer). Accordingly, the controller can, upon reviewing the history data, determine faulty sensors, etc., and can optionally ignore inputs from the sensor or deactivate the faulty sensor to avoid false alarms in the future. Additionally, a message (as shown in FIG. 5G) may be displayed to alert for example, the user, etc., of the faulty sensor or another message alerting of the faulty sensor can be displayed in other menus (e.g., menu 5A) to alert of the faulty sensor before the alarm is set and to optionally provide a user the ability to manually override the faulty sensor to avoid false alarms in the future. The various screens displayed on the display may also be sent to a mobile communication device of the user via various messaging methods. For example, an e-mail or SMS messaging system and/or a GUI-enabled messaging system may be used.

Figure 7:
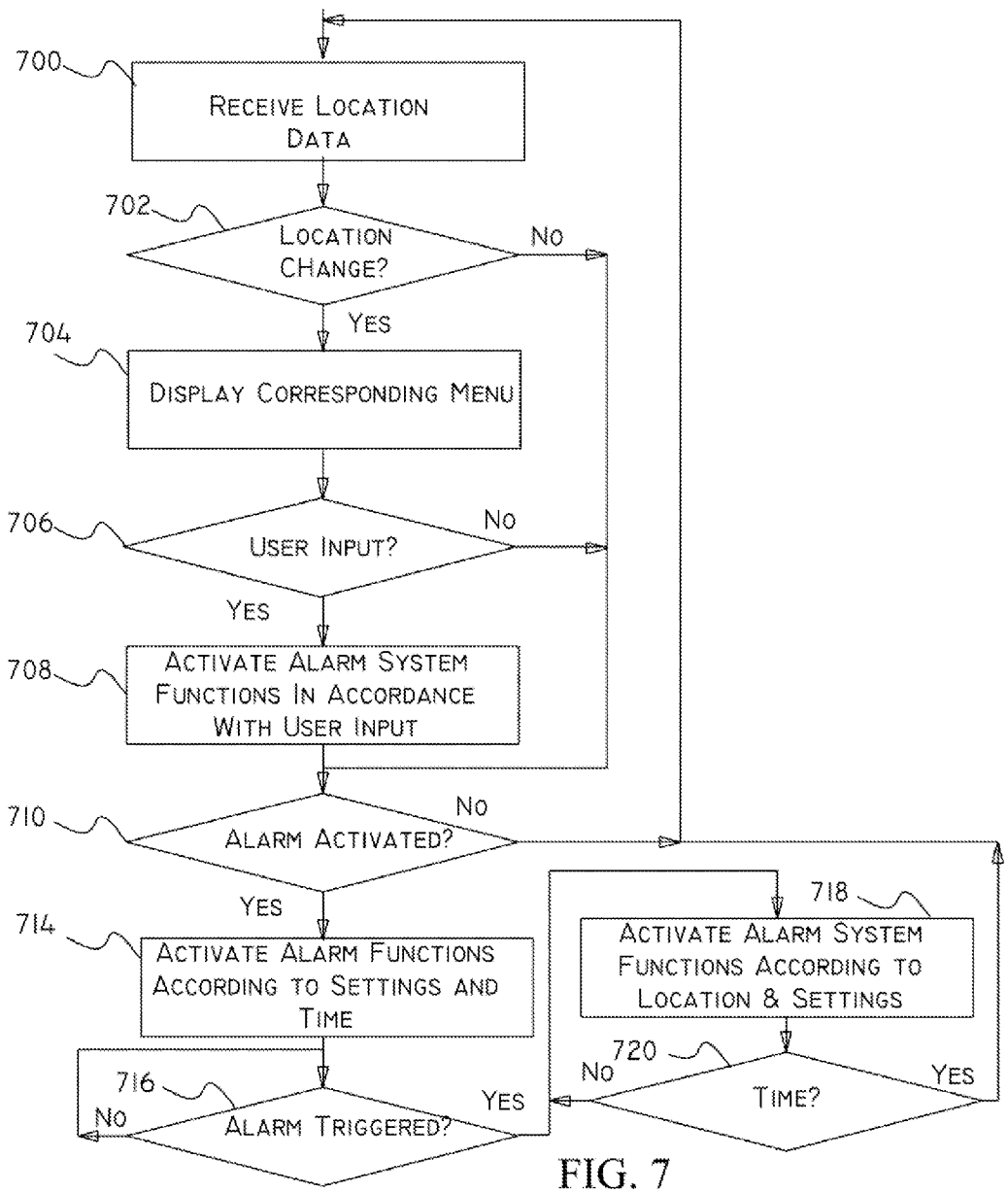
FIG. 7 is a flow chart illustrating the operations of the alarm system according to the present invention.

A flow chart illustrating the operations of the alarm system according to the present invention is shown in FIG. 7. In step 700, location data (e.g., GPS data, triangulation data, AASA data, AGPS data, a broadcast signal, etc.) is received and the location of the alarm system is determined.

In step 702, it is determined whether location data has changed (preferably within a predetermined period of time such as two minutes). If it is determined that there has been a location area change, the alarm system proceeds to step 704. The predetermined period of time can be used so that if a vehicle has just driven into a valet parking area, a gas station, etc. it could be determined that there recently was a change of location and the system can respond accordingly. However, if the vehicle has been in the new area for more than the predetermined period of time, it can be determined that displaying a menu corresponding to the location may not be necessary. This method may be advantageous in situations where the user may sit in the car for an extended period of time (e.g., waiting on line to pick up passengers, waiting in traffic, etc.). However, the predetermined time period is optional, and the alarm system may change a menu display when it detects that the location has changed (e.g., from a first area to another area, such as a valet parking zone, a hospital zone, etc.) or that the vehicle has begun to move after being stopped for a period of time (e.g., when waiting on line at a gas station, etc.), such that a desired display may be displayed when deemed appropriate. The system may also use speed to determine whether certain options may be activated. For example, the vehicles speed may be determined before, for example, the seat belts, the fuel door, etc. can be activated (e.g., opened).

In step 704, a menu corresponding to the location and/or the location data is displayed. For example, if it is determined that the vehicle is in a hospital zone, then a menu corresponding to the hospital area is displayed. Likewise, if it is determined that the vehicle is in a valet parking area, then a menu corresponding to a valet area that is similar to that shown in FIG. 5A may be shown.

In step 706, the alarm system determines whether user input was received within an optional predetermined period of time (e.g., 20 seconds). If the determination of step 706 is positive, the system proceeds to step 708. However, if the determination is negative, the system proceeds to step 710.

In step 708, the alarm system may activate functions corresponding to the user's input in step 706 or to a default setting if a user's input was not received. Accordingly, if, for example, a fuel station menu was displayed (in step 704) and a user selected the refuel menu item (i.e., requested that the fuel door be opened), then (when it is optionally determined that the vehicle has been placed in park—in automatic vehicles or the parking brake is engaged—in manual vehicles) the controller signals to open the fuel door in step 708. Also, depending upon vehicle options and settings, the ignition can be turned off, the vehicle's doors can be unlocked, and seat belts can be released (e.g., by using an automatic solenoid, etc.). Accordingly, by selecting a single menu item, a user can conveniently perform a plurality of tasks. This can increase convenience and provide an increased safety factor to occupants of the vehicle. For example, by unbelting certain passengers (e.g., passengers who are not in children's seats, or selected seats), in certain areas, the danger posed by fire in fueling stations, may be reduced.

In step 710, it is optionally determined whether the alarm system has been activated, and if the determination is positive, step 714 is performed. However, if it is negative, then step 700 may be repeated. Likewise, as steps 710-720 are optional, step 700 may be repeated instead of steps 710-720

In step 714, the alarm functions are set according to the received location data and optional history data.

In step 716, it is determined whether the alarm system has been triggered.

If it is determined that the alarm system has been triggered in step 716, then the alarm system is activated using the set functions in step 718, and the controller monitors conditions and responds accordingly. For example, if the function mode set by the alarm corresponds with area 3 shown in Table 2 above, then the controller would control the alarm functions such as the lights and audible alarm to activate only within the predetermined time period (i.e., within the 60-second window for the audible alarm and the full alert time for the lights). It is assumed the alarm triggering time has a maximum value of 90 seconds, at which time the controller resets the alarm and optionally updates the history (e.g., to prevent false alarms).

The controller may also control such that the various operational steps as described herein, may be overridden such that the controller may exit any step or loop as shown in the drawings of the present invention. For example, if the alarm system is reset by a user, then the system can return to step 700. The controller also monitors conditions and activation time and history to determine when and how to perform various functions.

In step 720, it is optionally determined whether a predetermined period of time has expired, and if so, the alarm system returns to step 700. Although this step is illustrated as a separate step, this step may also be performed in compliance with various time settings and may be combined with other steps as opposed to being a separate step as shown.

Figure 8:
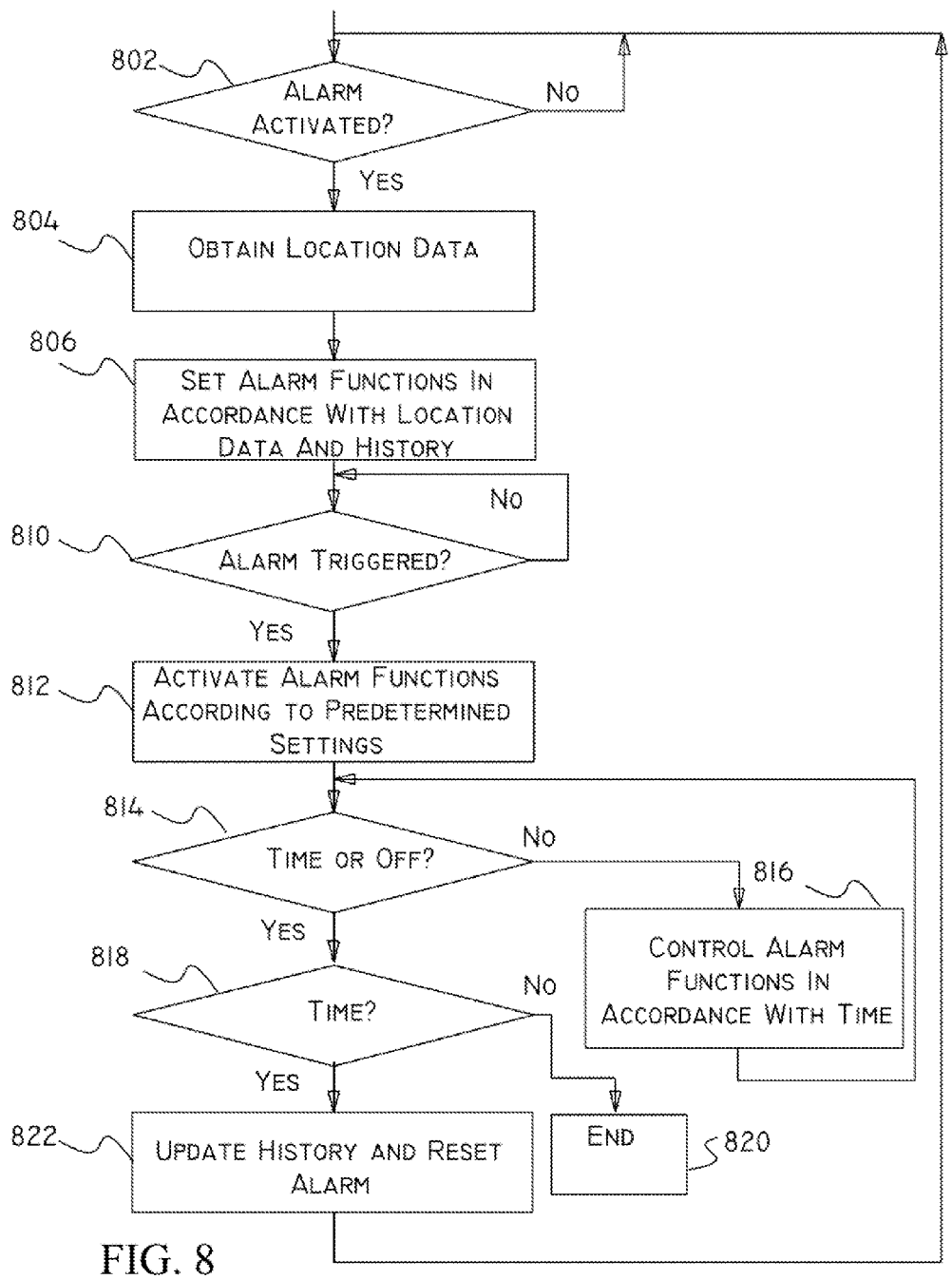
FIG. 8 is a flow chart illustrating the operations of the alarm system according to the present invention.

A flow chart illustrating the operations of the alarm system according to the present invention is shown in FIG. 8. In step 802, it is determined whether alarm activation conditions are met (e.g., vehicle in park, ignition is off, etc., as desired). Based on this determination, the system proceeds to step 804, and obtains location data.

In step 806, alarm-system functions corresponding to the location data are set and the system proceeds to step 810. The alarm-system functions may be activated according to a present state. For example, the present state is an initial activation state (i.e., the alarm has not been triggered). Accordingly, functions can be activated according to this state, which can, depending upon embodiment, refer to a present state, a past state (e.g., the previously-used state), and/or any state as desired. Thus, for example, when the alarm system activates, the vehicle's door locks can be locked, a light may be flashed to indicate that the alarm system has been activated, etc. During this step, alarm functions such as door locks, etc., may be activated (e.g., to lock the vehicle) according to their predetermined settings. However, functions corresponding to a triggered state are not activated. For example, unless triggered, the alarm system will only honk a horn momentarily to indicate that the vehicle is locked but would not activate the horn continuously, as it would if the alarm were triggered (and horn function is active).

In step 810, it is determined whether the alarm system has been triggered. If it is determined that the alarm system has been triggered, step 812 is performed, and if it is determined that the alarm system has not been triggered, step 810 may be repeated.

In step 812, the alarm system functions are activated according to predetermined settings, and the system thereafter performs step 814.

In step 814, it may be determined whether a predetermined time period has expired or the alarm system has been turned off. This is an optional step, and can, for example, be performed in step 812. If the determination of step 814 is negative, then step 816 is performed; otherwise, step 818 is performed.

In step 816, alarm-system functions are controlled according to time. For example, if the predetermined functions of the alarm system vary according to time, then they are controlled as per their settings. Other alarm-system functions that do not vary with time, are not varied.

In step 818, it is determined whether the predetermined time period (e.g., measured, for example, from the moment the alarm is triggered, an alarm function is generated, etc., as desired) has expired. If the determination is positive, then step 820 is performed; otherwise step 822 is performed.

In step 820, the alarm system is shut down.

In step 822, the alarm system history is updated and the system returns to step 806.

Figure 9:
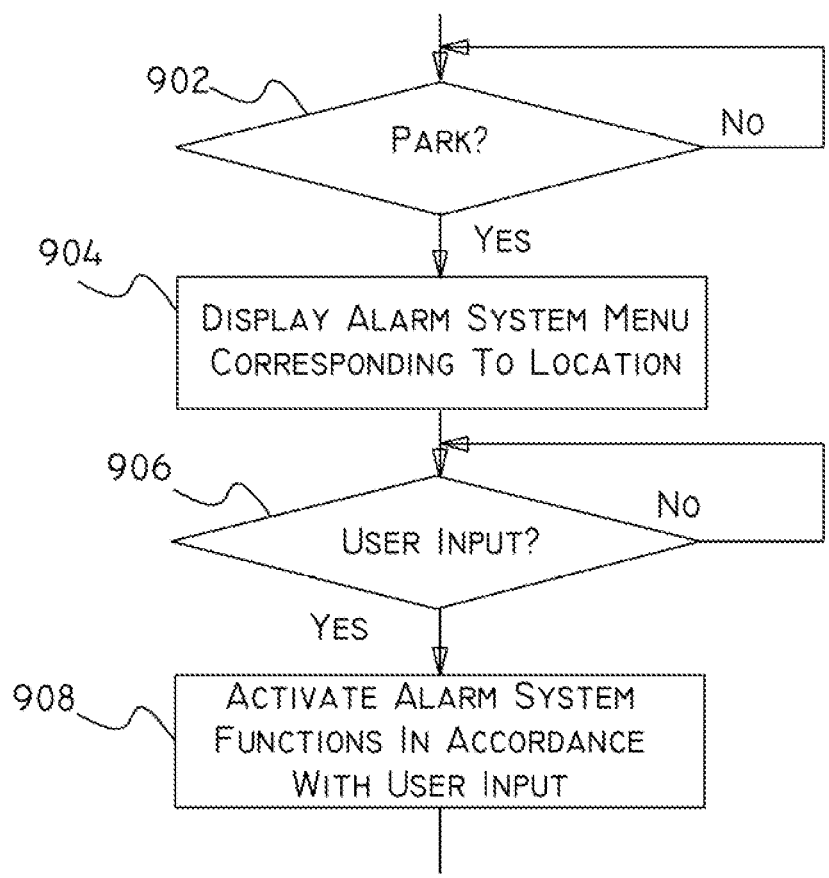
FIG. 9 is a flow chart illustrating the operations of the alarm system according to the present invention.

A flow chart illustrating the operations of the alarm system according to the present invention is shown in FIG. 9. In step 902, it is determined whether the vehicle is being parked. One or more signals may be used to indicate a parked status. For example, a transmission indicator may be used to indicate that the vehicle is in the parked position. However other sensors may also be used to determine whether the vehicle is parked. For example, the alarm system according to the present invention may determine that a vehicle is parked if the vehicle remains stationary on the street for 30 seconds, is off (i.e., the ignition is off and no key is in the ignition switch or, in the case of an RFID-key-equipped vehicle, no RFID-key is in the vehicle or a part of the vehicle) and/or the vehicle is in reverse (for manual-transmission-equipped vehicles), etc. If it is determined that the vehicle is parked or is about to be parked (e.g., the vehicle was stopped for 10 seconds and then proceeds in a reverse direction), then an alarm system menu corresponding to the location may be shown. If the determination is positive, the alarm system proceeds to step 904.

In step 904, an alarm system menu corresponding to present location is displayed for user interaction.

In step 906, it is determined whether a use input is received. If the determination is positive, the alarm system is activated according to user input and/or location.

In step 908, the alarm system is activated according to the set functions and an optional time input.

The present invention can operate by itself or with other systems. For example, in FIGS. 10A-10C, block diagrams illustrating the system according to the present invention in which, for example, the restriction module may interface with, for example, conventional and/or other vehicular systems (e.g., alarm systems, etc.) is shown.

Figure 10A:
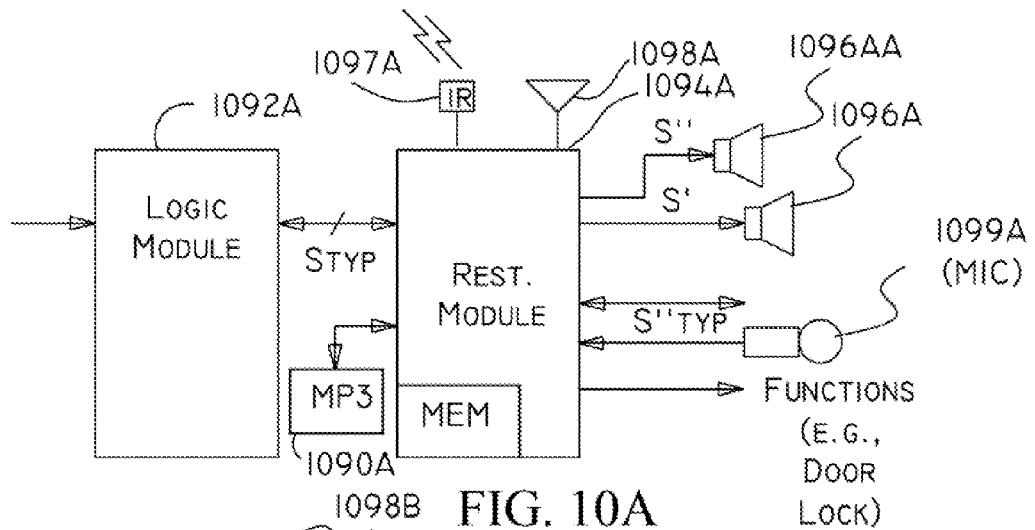
FIGS. 10A-10C are block diagrams illustrating alarm systems according to the present invention.
Figure 10B:
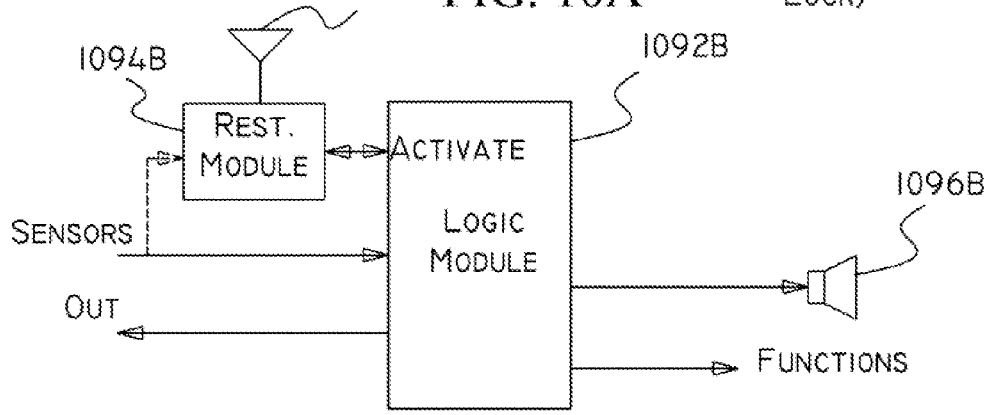
Figure 10C:
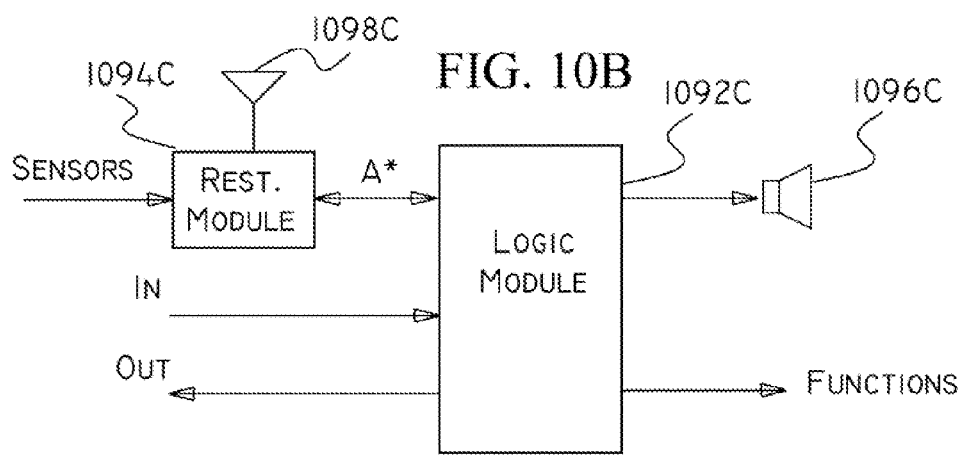

With reference to FIG. 10A the alarm system according to the present invention includes a logic module 1092A, an alarm restriction module 1094A, and a speaker 1096A. The logic module performs functions such as controlling the operation of the alarm system, and outputs one or more signals to the restriction module. The restriction module includes a receiving means for receiving a restricting signal via a receiving means such as an antenna 1098a, an infra-red (IR) receiver, an RFID signal, etc. The restricting signal may be any signal which identifies a specific area. For example, the restriction signal can include a signal such as a pilot carrier signal, a coded signal, an IR signal, or combinations thereof, etc., as desired. If the restriction module determines, using the received restriction signal, that the area is an alarm-restriction area, the restriction module would block (or attenuate, as desired) signals transmitted to the speaker 1096A. For example, assuming that in a typical alarm system a signal $S_{typ}$ is generated when an alarm system is triggered, $S_{typ}$ can be used to signal the speaker to generate an alarming sound (or to drive the siren). However, in the present invention, $S_{typ}$ can be transmitted to the restriction module, which determines whether to signal (or drive) the siren according to the location of the alarm system (or other variables). Accordingly, if the restriction module, determines that an audible sound is permissible (based on the location data or on an optional user's setting), the restriction module would then transmit a signal S' based upon signal $S_{typ}$. Accordingly, if $S_{typ}$ is transmitted at certain frequencies or amplitudes to produce certain sounds (such as tunes, voice, etc.) and amplitudes, S' can mimic $S_{typ}$ so that the speaker produces the same or similar sounds. In this regard, the restriction module can include means that would generate a signal S' and/or means to pass or selectively block signal $S_{typ}$ (which would be output as signal S' as shown in FIG. 10A) based on the determination of whether the speaker should remain silent, be attenuated, or activate without restriction. Accordingly, if it is determined that the speaker should not output sound at more than a predetermined volume and/or should not output sound of a certain frequency, then attenuation means (not shown) may be used. For example, a microphone (MIC) 1099A may be used to feed back various characteristics of sound emitted from the speaker 1096A. These characteristics can then be used by the restriction module to determine a sound level, for example in dB (decibels), and may also determine frequency and adjust signal S' so that it is in accordance with predetermined settings.

The restriction module may also determine characteristics of the signal $S_{typ}$ and thereafter output an appropriate signal S'. For example, the frequency and/or amplitude of either or both $S_{typ}$ or the sound output by speaker 1096A (and thereafter detected by a microphone 1099A or other pickup device) may be used to distinguish between a signal emitted from an alarm system indicative of an alarm sound, and a signal indicative of a driver using a vehicle's horn (a horn signal). For example, an alarm signal may be repeated at certain amplitudes and/or frequencies (e.g., 63 Hz), whereas a horn signal (produced as a result of a driver using the vehicle's horn) will most likely use lower frequencies which may be non-periodic and/or variable. Thus, if the restriction module detects a signal having a certain frequency (or a signal having a frequency equal to or greater than 63 Hz), it may determine that the sound (or signal $S_{typ}$) is an alarming sound (or signal indicative of an alarm) and adjust its settings so that S' would be in accordance with various settings (e.g., those shown in Tables 1 and/or 2). However, if the restriction module detects that $S_{typ}$ has a frequency less than 63 Hz (and/or is, for example, non-periodic, or continuous), it may pass the signal $S_{typ}$ (as S') to the speaker 1096A so that the vehicle's horn may be used by the driver without any interruption.

Although the restriction module can pass $S_{typ}$ as S', the restriction module may do this passively or actively. In other words, the restriction module may merely substantially pass $S_{typ}$ through as S', it may process $S_{typ}$ using amplification means, attenuation, filtering means, and/or other means to output a signal S' that is indicative of $S_{typ}$, or it may substitute $S_{typ}$ with another signal or signals. Thus, the restriction module may output a signal S' (and/or S") that corresponds with a predetermined tune (a frequency or frequencies, melody, song, MP3 data, etc.) contained in its memory (MEM—that can include a RAM, ROM, Flash memory, etc.) and/or in an external memory (e.g., a user's MP3 player), when it determines that an alarm signal is being output. Likewise, the restriction module may output a desired selection, when it determines that a horn signal is being output. The restriction module may also switch signal S' to signal S" that is output to a different audible device (and vice versa). Thus, if speaker 1096A is a horn that has a limited bandwidth (and can only output a horn sound), and 1096AA is a speaker that has a wider bandwidth (and can output various frequencies such that it can reproduce voices, songs, etc.), the restriction module may output signals S' and S" such that the appropriate speaker is used to properly reproduce data output through S' and/or S". Thus, the restriction module, if playing MP3 data, may use speaker 1096AA, and may output a horn signal via speaker 1096A.

Accordingly, the restriction module may, upon detecting that $S_{typ}$ (which, for the sake of this example is a periodic signal at 73 Hz) is an alarm signal (as opposed to a horn signal), output a signal S' that can be for example, a musical melody, an emulated voice, etc., via speaker 1096AA.

Thus, when the restriction module receives $S_{typ}$ and/or a feedback signal $S''_{typ}$ (e.g., from the MIC 1099A), the restriction module can determine (using either signal) whether an alarm sound is being output. Accordingly, if it is determined that an alarm sound is being output (i.e., that $S_{typ}$ is an alarm signal), the restriction module may output a signal S' or S" that includes a desired alarm sound. The desired alarm sound can include a musical tune, a song, etc., that may be stored in the internal memory (MEM) or received through a module (e.g., an MP3 module 1090A as shown). Accordingly, a user may customize his alarm system to play a desired musical selection (musical data) in a desired format if the restriction module detects that $S_{typ}$ or $S''_{typ}$ is indicative of an alarm sound. Likewise, the restriction module may output a desired tune or tunes when it determines that a horn sound is being output.

The restriction module may also output multimedia data (e.g., to one or more displays) contained in the vehicle. Thus, the restriction module may also output desired MPEG (Motion Picture Experts Group)-3 data that can be received via a broadcast or via a memory (such as MEM or 1093A) to a suitable display (not shown).

The restriction module may contain a suitable filter or filters (e.g., a bandpass, lowpass and/or highpass) to pass predetermined frequencies (e.g., 73 Hz contained in $S_{typ}$) and/or may use active means. For example, signal $S_{typ}$ may be fast-Fourier transformed and thereafter analyzed. Accordingly, the transformed $S_{typ}$ can be compared with predetermined data to determine whether it corresponds with a horn or an alarm. Moreover, commonly available analysis programs, systems, and/or methods may be used to determine data contained in $S_{typ}$ and/or $S''_{typ}$. In this regard, the restriction module may be programmed to recognize a particular frequency, pattern, amplitude, etc., output via $S_{typ}$ or the vehicle to train it to the vehicle. Moreover, the restriction module may be programmed with data corresponding to the vehicle or can receive a code corresponding with the vehicle and set its settings according to predetermined data contained in a memory (e.g., MEM). Thus, the restriction module may have a programming mode and/or a training mode. In the programming mode, a code corresponding with a vehicle type, classification, etc., may be entered into the restriction module. While in the training mode, the restriction module may train itself to the vehicle.

Thus, the restriction module can be compatible with existing vehicular alarm systems and horns and can meet existing motor vehicle safety standards and/or regulations.

While FIG. 10A illustrates a restriction module attached between an alarm module and the siren, the restriction module may be located in other locations, as desired. For example, with reference to FIG. 10B, a restriction module 1094B is coupled to an alarm module 1092B. The restriction module can receive one or more signals from the alarm module (e.g., an activation signal) and return signals (e.g., a restricted signal) to the alarm module which would convey information to the alarm module so that a triggering event, depending upon location, would not permit an audible output from a speaker 1096B. For example, as shown, the restriction module receives a signal via an antenna 1098B, and determines whether the alarm system is in a restricted area and whether an audible alarm is permitted. Accordingly, based upon the determination, a restriction signal may be sent to the alarm module. In this manner, the restriction module can transmit an activation signal to the alarm module to control activation of the alarm function or can transmit a signal to control any desired function of the alarm module (e.g., the speaker output). Accordingly, based on location information, the restriction module may control the activation of the alarm module. Although there are many ways to control the alarm module, control of the alarm module may be accomplished in response to a signal generated by the alarm module or before a signal is sent. Thus, if the restriction module determines that the audible alarm should not be generated, the restriction module may, at any time, generate a signal indicative of the determination. In this regard, the alarm module may have an input and/or control means for controlling activation, audible alarm generation, door locking functions, etc. The restriction module may also pass, block, and/or generate certain signals or block them from passing to the alarm module to control the alarm function module.

However, if, for example, the alarm module does not have sufficient inputs, "dummy signals" may be generated to "trick" the alarm module into operating in certain states, as desired. Thus, for example, if the restriction module determines to restrict the audible alarm, the restriction module may generate a signal to prevent the alarm module from activating, triggering, or outputting an audible alarm. In this regard, a "false signal" may include a signal corresponding to an open or closed door, ignition on or off, etc., which would prevent activation of the alarm module (e.g., activation or prevents triggering). Thus, upon receiving the false signal, the alarm module would either not activate and/or not trigger. Accordingly, the restriction module may include means to generate or block one or more desired signals such as an ignition-on or -off signal, a door-open or -closed signal, a trunk-open signal, a hood-open or -closed, a motion signal, an activation or non-activation signal, etc. (at a desired assertion level), to accomplish this task. This is more clearly shown with reference to FIG. 10C where a restriction module 1094B is placed such that it can receive sensor inputs (from sensors such as an ignition-on sensor, a door-open sensor, a hood-open sensor, a trunk-open sensor, a motion sensor, a pressure sensor, a noise sensor, etc. as are typically used in vehicle alarm systems) and pass, block, and/or generate signals to be input into corresponding inputs of an alarm module 1092A so that the alarm system can be operated in accordance with location. Accordingly, if the restriction module receives information indicating that it is in an alarm restricted area, the restriction module may transmit a signal such as a door-open or -closed signal, an ignition-on signal, a reset signal, etc., to cause the alarm module to assume certain states (e.g., to prevent activation, or to prevent triggering, etc.). Thus, for example, if the alarm module receives a signal from antenna 1098C and determines that it is in an alarm restriction area, the restriction module may block sensory inputs such as door-open, hood-open, trunk-open, sound, vibration and motion-sensor inputs to prevent the alarm module from triggering. However, activation of the alarm module may not be prevented and thus functions such as door locking, ignition or starter deactivation, etc. upon activation of an alarm function would not be prevented. Further, the restriction module may directly pass or block outputs of the logic module so that undesired signals may be controlled. Further, a restriction device may be included between the speaker 1096C and the logic module 1093C to pass or block signals to speaker 1096C, as desired.

Figure 11:
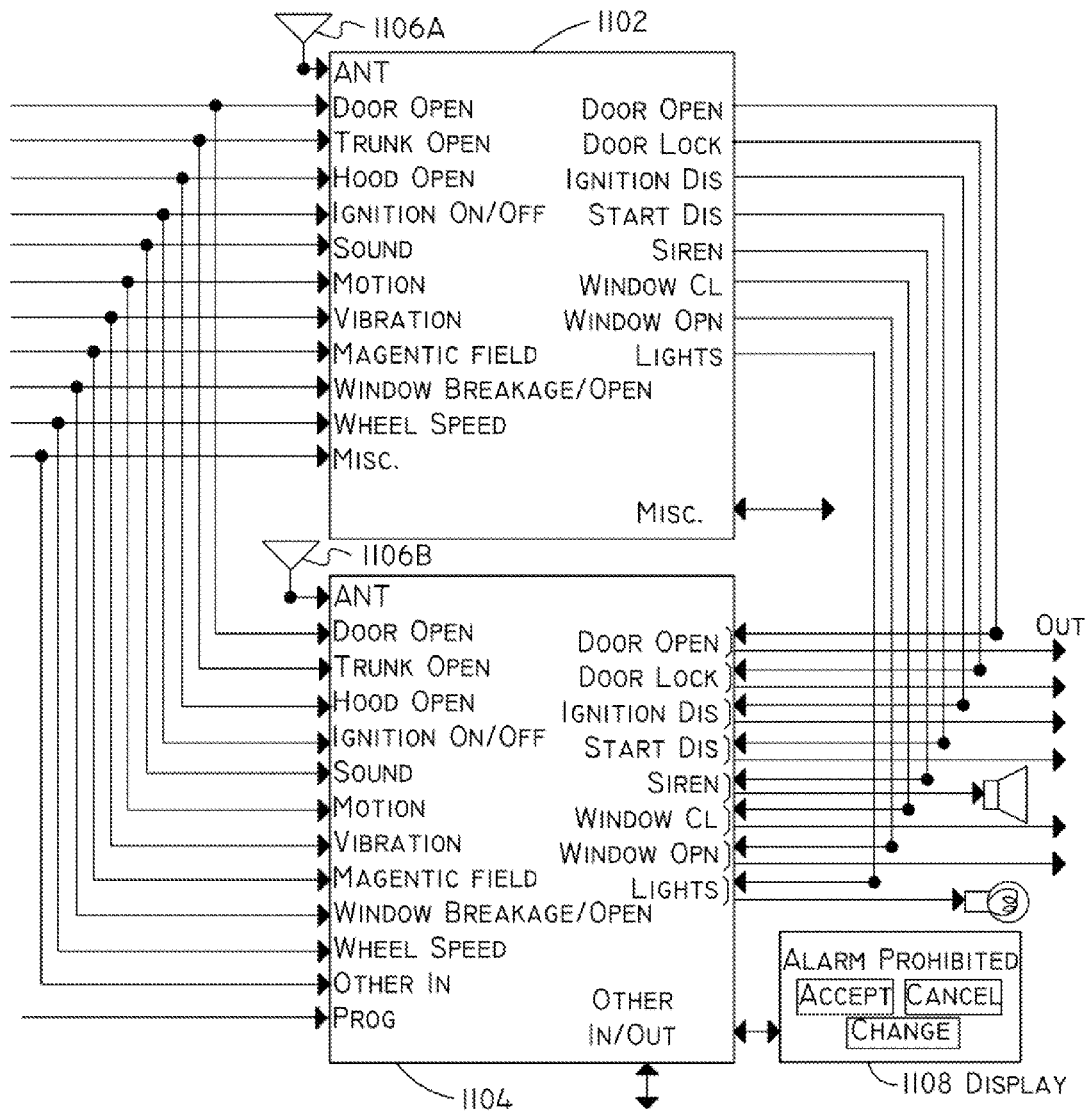
FIG. 11 is a block diagram illustrating a conventional alarm module coupled with a restriction module according to the present invention.

FIG. 11 is a block diagram illustrating a conventional alarm module coupled with a restriction module according to the present invention. A conventional alarm module 1102 has a plurality of conventional inputs for indicating the status of particular sensor inputs such as, for example, a door open (which may indicate any door is open or an exact door is open), a trunk open, a hood open, ignition off (and/or on), sound, a motion, a vibration, window breakage, wheel speed, etc., inputs as are typically used in vehicular alarm systems, a plurality of outputs, such as, for example, a door open, a door lock, ignition disable, starter disable, horn/siren, window lock, lights, etc. as are typically used by alarm modules, other miscellaneous input/outputs, and an antenna. A restriction module 1104 optionally includes one or more inputs and/or outputs that may correspond with inputs and/or outputs of the alarm module 1102. Outputs from the alarm module 1102 are transmitted to the restriction module 1104, which depending upon location and/or settings, may pass, block, and/or modify a corresponding output. For example, using location information, the restriction module 1104A would determine whether it is located within an alarm restricted area and pass or block signals received from the alarm module 1102 appropriately. Thus, for example, if it is determined that the vehicle (or parts thereof) is in an alarm restriction area in which an audible siren is prohibited, the restriction module would block a received siren signal that is received from the alarm module 1102. Likewise, this signal would be passed (or modified accordingly) if the restriction module 104 determines that it (or parts of the vehicle) is not in a restriction area. In other words, if the controller determines that it is not within an alarm restriction area, the controller can be programmed such that the signals received by the restriction module are passed through the module (e.g., without any substantial change), and corresponding signals are output from the restriction module Although not shown, the one or more inputs and/or outputs to the alarm module 1102 may first pass through the restriction module which may pass, block, and/or modify them and thereafter transmit them to the alarm module 1102. Accordingly, the restriction module 1104 may receive an input such as an ignition-off input (which would normally be input to the alarm module 1102) and may pass, block, and/or generate a corresponding signal for input to the alarm module 1102 depending upon location and/or settings. For example, upon receiving a signal such as the ignition-off indicator, the restriction module may determine not to output an ignition-off indicator to the alarm module 1102. Accordingly, activation of the alarm module 1102 may be prevented, as desired. Moreover, the restriction module 1104 may use an audible and/or visual indicator to indicate its status. Thus, the restriction module 1104 may flash the lights and/or honk the horn according to predetermined patterns to alert the user of its status. Additionally, the status may be displayed on a display (e.g., a touch screen, etc.) to alert the user and receive commands (e.g., cancel, change, accept, etc.) as desired.

Likewise, depending upon location, settings, etc., if it is not desired to prevent the alarm module from activating (i.e., arming), but rather to only prevent the output of an audible alarm sound if the alarm system is triggered (e.g., by a door opening, etc.), the restriction module (upon detecting one or more activation signals such as an ignition-off signal, etc., as desired) would only block the output of the restricted function (i.e., the horn output) and let all other signals pass which would enable them (the other functions) to operate as they normally would absent any restrictions. Thus, if activated, and it is desired to restrict (i.e., block, prohibit), the output of an audible siren/horn alarm function such as light activation, ignition disable, etc., the restricted functions would not be activated as they would normally be absent a restriction area.

Although the restriction module 1104 is shown interfaced with a conventional alarm module (e.g., 1102), it is envisioned that the restriction module can operate independently of the alarm module.

Figure 12:
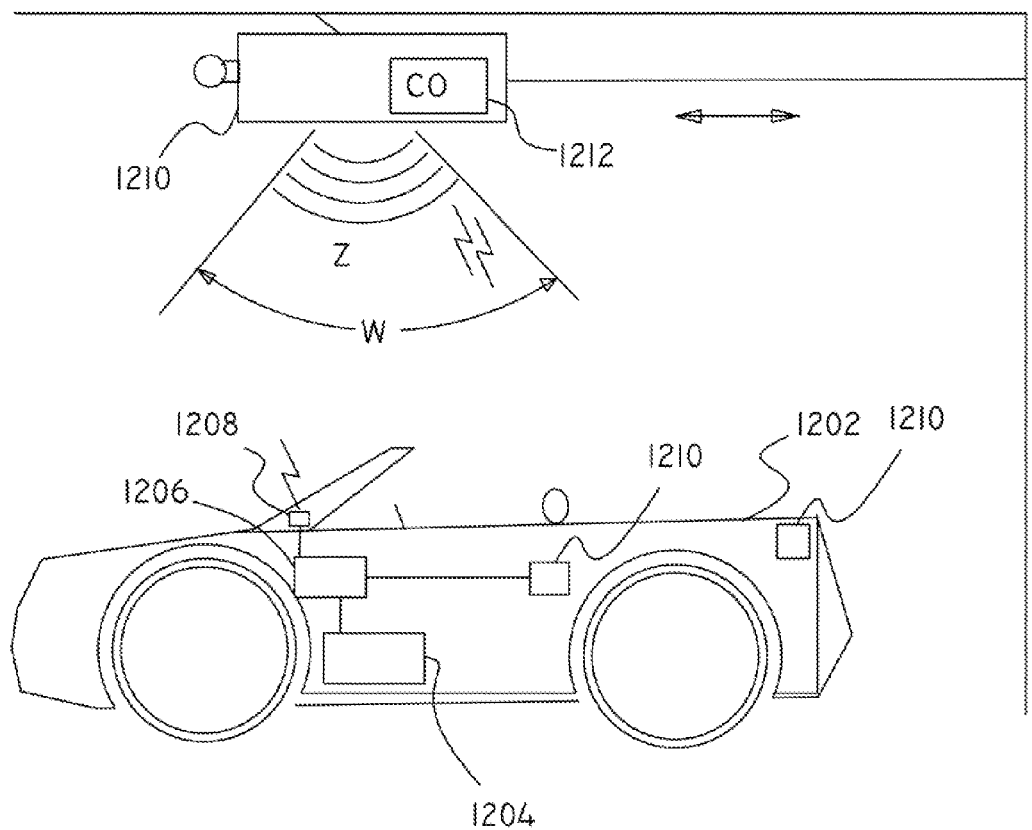
FIG. 12 is a block diagram illustrating a vehicle including a conventional alarm module and a restriction module communicating with garage signal according to the present invention.

FIG. 12 is a block diagram illustrating a vehicle including a conventional alarm module and a restriction module communicating with a garage signal according to the present invention. This system is similar to the system shown in FIGS. 10A-C and 11, and described above. The vehicle 1202 includes a conventional alarm module 1204, a restriction module 1206, and a reception module 1208. The vehicle 1202 is parked in a garage including a garage transmitter 1210 (which can be included in a garage door opener as shown). The park transmitter transmits a signal (e.g., Z) such as an IR signal, including location data (e.g., a specific code, message, frequency, etc.) to indicate that the vehicle in the garage. The signal may have a predetermined strength or spread (e.g., see, W) so that a vehicle can determine that it is in a specific area (e.g., a private garage as shown). The restriction module receives the IR signal via the reception module and determines the location of the vehicle 1202. Using the location of the vehicle, the controller controls according to a predetermined routine. This predetermined routine may be set by the user, programmed by the factory, programmed on various occasions and/or preset intervals, etc., as desired, and may correspond with one or more locations and functions (as described elsewhere in this application). Thus, assuming the user has set a garage location to include preventing the door locks from actuating when in the garage (i.e., when receiving the IR signal corresponding to the garage), thus keeping the doors from being locked (even though the alarm is permitted to activate), then the door locks would be controlled accordingly, when it is determined that the vehicle is in the garage.

Likewise, when determining that it is located in the garage, the restriction module 1206 may activate various interfaced functions (e.g., see, FIG. 11 or FIG. 1). Thus, the restriction module may, for example, be set such that it causes a left rear door (on for example, a minivan) to slide open upon detecting that the vehicle is in the garage and wheel motion has stopped. Accordingly, a driver may step out of the vehicle and remove packages in the rear seat area of the vehicle in a single step without having to open the door. Likewise, a handicapped routine may be programmed to activate certain optional functions at certain times. Thus, for example, if the vehicle 1202 is equipped with a wheel lift for handicapped access, the wheel lift can be activated and brought into a waiting position for occupants of the vehicle 1202 without direct user intervention each time. This can minimize any inconvenience caused by having to wait for a wheel lift to extend to a functional position before it can be used. Thus, user safety and convenience are increased. The alarm system of the present invention may also include a gas sensor such as a carbon monoxide (CO) sensor as shown in FIG. 12. Upon detecting a sensed gas level (e.g., CO) which exceeds a predetermined threshold, a signal can be generated and used to warn of and/or control the sensed gas level. For example, when CO sensor 1212 generates a sensed gas signal which is determined (e.g., by a garage door opener's controller) to exceed a predetermined threshold, a signal can be generated to open the garage door, activate a ventilation system, and/or turn off an ignition function of the vehicle (thus turning off the vehicle), thus ensuring the safety of occupants in the garage and attached areas such as a house, etc., and/or vehicle.

Accordingly, the present invention may be used with conventional alarm systems to enhance the operation of these alarm systems and provide added user conveniences and advantages. Furthermore, the present invention could bring existing alarm systems into conformance with ordinances and regulations governing the operation of vehicular alarm systems. According to the present invention, a remote system may be used. Accordingly, for example, the location of a station (e.g., the vehicles alarm system) may be determined at a remote location. Then, regulations and/or settings regarding the mobile station may be transmitted to the mobile station. The mobile stations can then activate and/or alert a user with corresponding information. The user can then make selections, as desired. The remote system may include for example, a system such as the OnStar™ communication system or can include conventional wireless communication systems.

Figure 13A:
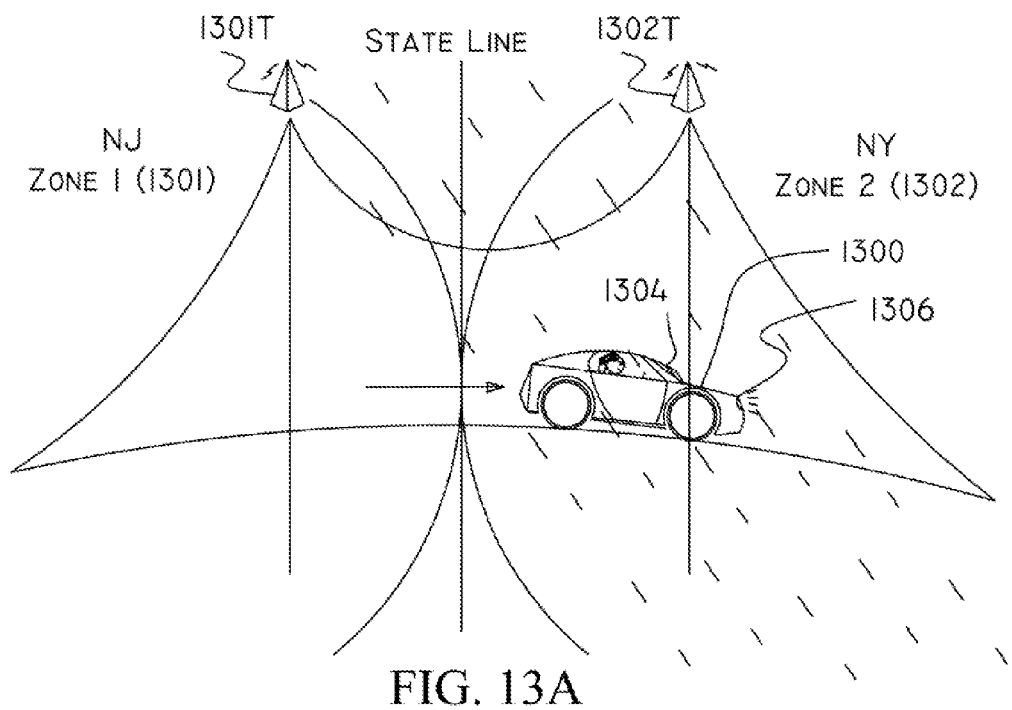
FIG. 13A is a block diagram illustrating a moving vehicle on a roadway according to the present invention.

FIG. 13A is a block diagram illustrating a moving vehicle on a roadway according to the present invention. As shown in FIG. 13A, the vehicle 1300 is assumed to be traveling from a first zone (Zone 1) 1301 to a second zone (Zone 2) 1302. The first and second zones are assumed to be located in different states (e.g., New York and New Jersey) that are assumed to have different vehicular operation requirements (e.g., regulations concerning the use of motor vehicles). For example, Zone 1 requires a vehicle to operate with its lights on when its windshield wiper system is switched on, while Zone 2 has no such requirement. However, the driver (being a resident of Zone 2) may not be aware of the requirements of Zone 1. However, according to the present invention, the system can detect (using methods described elsewhere in this application) that the vehicle has changed location (i.e., from Zone 2 to Zone 1) and set its functions accordingly—with or without the driver being aware—so that the driver may abide by all local regulations. Thus, for example, the system according to the present invention may detect whether the windshield wipers 1304 of the vehicle are turned on (e.g., using sensor data (such as a windshield wiper switch input—not shown) and output an appropriate signal to operate the lights 1306 of the vehicle such that the operator of the vehicle complies with local requirements.

Figure 13B:
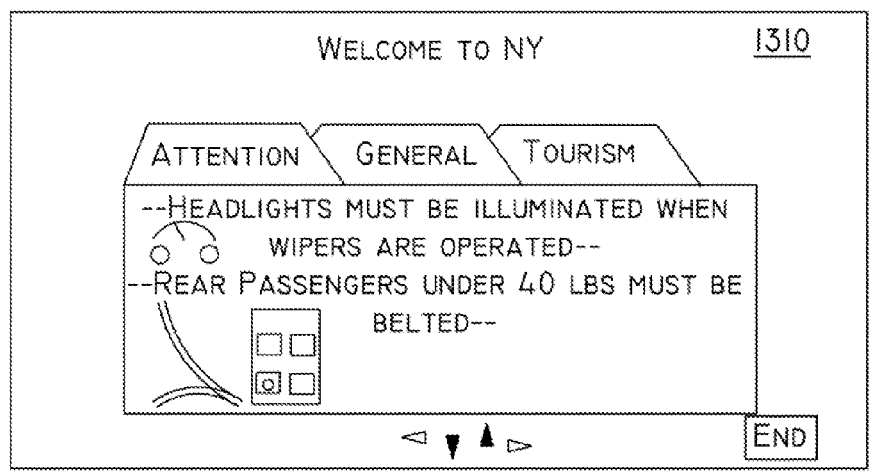
FIG. 13B is a screen shot illustrating operations determined by the system according to the present invention.

Additionally, other information such as seat-belt-buckle sensor information and seat-occupant-sensor information (which are known in the art) may be used to determine whether a seat is occupied, and the approximate size and/or weight of the occupant may be used to inform the driver whether additional seat belt use is required. A look up table (not shown) may be used. For example, the look-up table may include information indicating that a rear seat passenger under 40 pounds in weight must be buckled in the vehicle's present location. Thus, depending upon location, if it is determined that a rear-seat passenger must be belted, the driver and/or the passengers may be informed of such requirements such as shown in FIG. 13B in screen 1310. Other information such a tourism information, general rules (e.g., motor vehicle operating rules, etc.) may also be displayed for the user's convenience on a display.

The system of the present invention can not only automatically set (depending upon settings) functions according to location, but it may also display local requirements on the display to alert the driver and/or passengers of these requirements according to location. Thus, an operator may be informed via the display whether seatbelts are required for all passengers in the current location. The system of the present invention may also alert the driver and/or occupants for example, that seatbelts are required, by using a vibratory, audio, visual means or other means. For example a vibrator may be located in and/or on a seatbelt anchor part or in a seat to remind a user that seatbelt use is required. Thus, if the system of the present invention detects that a rear seat passenger is not buckled when required (e.g., using seat occupancy data and/or seatbelt data obtained via conventional sensors), the alarm system may output a visual alert on the display, and actuate an LED contained in the corresponding anchor part, or use another type of display, to alert the driver and/or passenger to buckle the seat belt.

In another embodiment, the vehicle may detect that it is towing an object (e.g., through sensor data obtained from a trailer harness connected to the vehicle's wiring system or by detecting an increased current draw, etc.,) and may alert the operator to avoid (or to exit) parkways upon which trailer operation is restricted. Thus, the location of the vehicle may be used by the system of the present invention to set its functions accordingly. However, the system of the present invention may also upon detecting a change in operating characteristics of the vehicle, alert the user regardless of location. Thus, if the system according to the present invention detects that a trailer is being towed (e.g., using increased-current information, or load information via on-board suspension sensors (not shown)), it may display predetermined information without regard to location. This information can include trailer-towing directions, information indicating a maximum recommended speed when towing a trailer (e.g., 55 MPH) and information concerning recommended routes. For example, the alarm system may obtain data including the temperature of various fluids in the vehicle from on-board sensors (e.g., wireless and/or wired data transmission), and the alarm system can then analyze this data and provide desired information to the driver. For example, if it is determined that the transmission oil temperature is beyond specified limits (e.g., beginning to overheat), the alarm system can display a screen informing the driver and optionally reroute the driver (so that roads more suitable to the vehicle's condition can be used) and/or display map data (e.g., a GPS-navigation-system-type map) on a screen indicating the re-routed directions. Thus, if the driver is on a hilly high-speed freeway and it is determined that the transmission oil temperature is exceeding a predetermined limit, the system according to the present invention can use current location information and reroute the driver so that low-speed local roads and/or less hilly roads can be used.

The present invention may also analyze tire pressure, temperature, speed, and/or load and output information to the driver. This information can include information such as, for example, vehicle statistics, warnings, recommendations, route information, location information etc. Thus, for example, current sensory inputs (e.g., speed, tire temperature and/or pressure, vehicle load, current location, and/or other data), may be compared with a look-up table to determine a recommended operating window. Thus, assuming the driver is driving on a freeway at a speed that exceeds a first predetermined threshold and it is determined that the tire pressure is lower than another predetermined threshold and/or its temperature is higher than yet another predetermined threshold, an alert can be generated to inform the user of the vehicle, and a proper operating speed and/or rerouted directions may be recommended (e.g., by informing the driver of this speed). Likewise, when the vehicle exceeds a first predetermined velocity threshold, if it is determined that the air pressure is lower then another predetermined threshold, a warning can be generated and displayed to the driver regardless of tire temperature. The system according to the present invention may also obtain information relating to the vehicle such as, for example, timing belt condition, and display this information to a user for the user's convenience.

The present invention may also use tire inflation information (obtained wirelessly through tire sensors or though one or more typical on-board systems) and display an appropriate display with or without regard to location and operating variables. Thus, if the system according to the present invention detects that a tire has low air pressure, the system can alert the user of this and inform the user of desired operating procedures. Thus, the system of the present invention, may also inform the user to proceed at a speed below a certain setting and to avoid certain roads (e.g., high-speed freeways). The system according to the present invention, may also use map data to reroute a user to avoid certain routes depending upon vehicle variables. Thus, if a system on a vehicle (e.g., a transmission, engine, etc.) or element (e.g., a tire) on the vehicle is not operating correctly (e.g., a transmission is failing and cannot engage $3^{rd}$ and $4^{th}$ gears, a tire is running low, a low-speed temporary spare tire is being used, etc.), the system according to the present invention may use this data and/or optional location data to inform a driver of the situation and recommend a proper operating procedure and/or may reroute a user (e.g., using map data, GPS data, etc.) so that the vehicle (equipped with a navigation-capable display) can be operated on roads more suitable to its condition (e.g., low-speed local roads, roads with proper service (e.g., dealerships) available, etc.).

Thus, according to the present invention, a vehicular alarm system can minimize noise pollution levels and/or increase the safety and/or security of a vehicle and/or its contents, while complying with local ordinances and/or regulations. The alarm system may be updatable and can enhance user convenience and safety.

Certain additional advantages and features of this invention may be apparent to those skilled in the art upon studying the disclosure, or may be experienced by persons employing the novel system and method of the present invention, chief of which are that noise and other environmental pollution can be reduced. Other advantages of the present invention include enhancing safety of vehicle occupants and increasing user convenience.

While the invention has been described with a limited number of embodiments, it will be appreciated that changes may be made without departing from the scope of the original claimed invention, and it is intended that all matter contained in the foregoing specification and drawings be taken as illustrative and not in an exclusive sense.

What is claimed is:

1. A mobile station including a plurality of wheels, comprising: a receiver which receives location information; and a controller which: determines the location of the mobile station using the location information; determines whether the mobile station is in an energy refilling area based upon the determined location of the mobile station; and renders an energy refilling menu when it is determined that the mobile station is in an energy refilling area, wherein the energy refilling menu comprises at least one selection item which comprises at least one of an energy refilling menu item, a refueling menu item, a door open menu item, a seat belt release menu item, and an engine off menu item.

2. The mobile station of claim 1, further comprising a display which renders the energy refilling menu.

3. The mobile station of claim 1, wherein selection of the at least one energy refilling menu item causes the controller to: unlock at least one door, unlock at least one seatbelt, perform a shut off, or set a ventilation system mode.

4. The mobile station of claim 1, wherein the controller further sets a ventilation system mode to a recirculate mode when it is determined that the mobile station is within a predetermined distance of the energy refilling area, wherein the energy refilling area is a fuel station.

5. The mobile station of claim 1, wherein the energy refilling menu includes a fuel suggestion.

6. The mobile station of claim 5, wherein the fuel suggestion is determined based upon a performance metric of the mobile station.

7. The mobile station of claim 6, wherein the performance metric of the mobile station comprises a comparison of engine knock to a threshold.

8. The mobile station of claim 6, wherein the fuel suggestion displays a determined fuel grade.

9. A method of operating a mobile station including a plurality of wheels, the method performed by at least one controller and comprising acts of: receiving, by a receiver, location information; determining the location of the mobile station using the location information; determining whether the mobile station is in an energy refilling area based upon the determined location of the mobile station; and rendering an energy refilling menu when it is determined that the mobile station is in an energy refilling area, wherein the energy refilling menu comprises at least one selection item comprising at least one of a refilling menu item, a refueling menu item, a door open menu item, a seat belt release menu item, and an engine off menu item.

10. The method of claim 9, further comprising an act of rendering the energy refilling menu on a display.

11. The method of claim 9, wherein selection of the at least one selection item causes the controller to: unlock at least one door, unlock at least one seatbelt, perform a shut off, or set a ventilation system mode.

12. The method of claim 9, wherein the controller further sets a ventilation system mode to a recirculate mode when it is determined that the mobile station is within a predetermined distance of the energy refilling area, wherein the energy refilling area is a fuel station.

13. The method of claim 9, wherein the energy refilling menu includes a fuel suggestion.

14. The method of claim 13, wherein the fuel suggestion is determined based upon a performance metric of mobile station.

15. The method of claim 14, wherein the performance metric of the mobile station is a comparison of engine knock to a threshold.

16. The mobile station of claim 14, wherein the fuel suggestion displays a determined fuel grade.

17. A mobile station including a plurality of wheels, comprising: a receiver which receives location information; and a controller which: determines the location of the mobile station using the location information; determines whether the mobile station is in an energy refilling area based upon the determined location of the mobile station; and renders an energy refilling menu when it is determined that the mobile station is in an energy refilling area, wherein the energy refilling menu includes a fuel suggestion.

18. The mobile station of claim 17, wherein the fuel suggestion is determined based upon a performance metric of the mobile station.

19. The mobile station of claim 17, wherein the fuel suggestion displays a determined fuel grade.

20. The method of claim 17, further comprising an act of rendering the energy refilling menu on a display.

* * * * *